(12) United States Patent
Chen

(10) Patent No.: US 8,437,427 B2
(45) Date of Patent: May 7, 2013

(54) ARBITRARY FREQUENCY SHIFTER IN COMMUNICATION SYSTEMS

(75) Inventor: Jeng-Hong Chen, Temple City, CA (US)

(73) Assignee: Integrated System Solution Corp., Hsin-chu (TW)

( * ) Notice: Subject to any disclaimer, the term of this patent is extended or adjusted under 35 U.S.C. 154(b) by 706 days.

(21) Appl. No.: 12/569,290

(22) Filed: Sep. 29, 2009

(65) Prior Publication Data

US 2011/0076952 A1 Mar. 31, 2011

(51) Int. Cl.
*H03K 9/00* (2006.01)
*H04L 27/001* (2006.01)

(52) U.S. Cl.
USPC ............................................ 375/316; 375/324

(58) Field of Classification Search .................. 375/316, 375/324
See application file for complete search history.

(56) References Cited

U.S. PATENT DOCUMENTS

| | | | | |
|---|---|---|---|---|
| 6,560,298 B1 * | 5/2003 | Froehling et al. | ............. | 375/344 |
| 2004/0096023 A1 * | 5/2004 | Bourdeau | ..................... | 375/362 |

* cited by examiner

*Primary Examiner* — Sam K Ahn
*Assistant Examiner* — Freshteh N Aghdam
(74) *Attorney, Agent, or Firm* — Birch, Stewart, Kolasch & Birch, LLP

(57) ABSTRACT

This invention describes a programmable, digital implementation to shift an arbitrary frequency, or various frequencies in various communication systems of the original signal in the frequency domain. The correspondent phase accumulation to perform the desired frequency shift per sampling instant is perfectly tracked by counting up or down a simple integer. Several arbitrary frequency shifters with different mathematical models are provided. The correspondent implementations with Look-Up-Tables (LUT) are derived for high-speed implementations without further calculations of the values of the sine and cosine functions every sampling instant. Furthermore, a simple shift-and-add phase rotation is described to replace the four required real multiplications. If the original complex signal contains only one-bit each from real part and imaginary part, a surprisingly simple implementation is derived and disclosed for the overall arbitrary frequency shift operation. Further simplifications are also disclosed to make this invention feasible for high sampling frequencies and small frequency drifts.

30 Claims, 5 Drawing Sheets

FIG 5B: TYPE D

FIG 5A: TYPE C

ARBITRARY FREQUENCY SHIFTER IN COMMUNICATION SYSTEMS

BACKGROUND OF THE INVENTION

1. Field of the Invention

The present invention relates generally to a frequency shifter used for wireless communication systems and more particularly relates to an arbitrary frequency shifter extremely useful for a digital communication system designed to operate with various communication systems which are centered at different frequencies in the frequency domain.

2. Background Art

Various wireless standards and communication systems are available in the market, e.g., cellular phones, wireless local area network (WLAN) systems, and Bluetooth devices. In practice, the signal is up-converted to a much higher radio frequency (RF) and is transmitted. It is the designer's choice to down-convert the RF signal directly to baseband or through an intermediate frequency (IF) first and then apply a digital phase shifter to down-convert the signal to baseband. With the growth of markets, it is of great interests to integrate different systems into a single device. One solution is to have one set of front-end analog or digital device for each communication system. The other better solution is to design only one front-end analog or digital device capable of operating at different RF or IF frequencies of different communication systems. The present invention theoretically provides the general theory to design a common digital phase shifter capable of performing arbitrary frequency shifts.

FIG. 1 shows the general implementations of a frequency shifter of the prior art. The conventional frequency shifter 100 mainly comprises a positive or negative frequency shift controller 110, a phase accumulator 120, a sine and cosine function calculator 130 and a phase shifter 140. A general frequency shifter 100 is used to shift an arbitrary frequency of the original signal in the frequency domain. The positive or negative frequency shift controller 110 is used to provide the 1-bit controller PN which controls sign indicators $S_2$ and $S_1$. The phase accumulator 120, receiving a phase increment per sampling instant, $\phi$, and the sign indicator $S_1$, is used to output a phase accumulation $\theta_n$ to the sine and cosine function calculator 130. The sine and cosine function calculator 130, receiving the phase accumulation, $\theta_n$, is used to provide sine and cosine values to the phase shifter 140. The phase shifter 140, receiving the sine and cosine values from the sine and cosine function calculator 130 and the sign indicators $S_2$, is used to output a complex signal, $\tilde{I}_n + j\tilde{Q}_n$, with a frequency shift equal to $\pm f_\Delta$ of the input signal, $I_n + jQ_n$.

The procedure is described as follows:

$$\tilde{I}_n + j\tilde{Q}_n = (I_n + jQ_n)e^{\pm j2\pi\left(\frac{f_\Delta}{f_s}\right)n} \equiv$$
$$(I_n + jQ_n)e^{j(1-2\times PN)n\phi} \equiv (I_n + jQ_n)e^{j(S_1 S_2)n\phi} \quad \text{(EQ-1)}$$

where $$\phi \equiv 2\pi\left(\frac{f_\Delta}{f_s}\right)$$

is the phase increment per sampling instant and the input to the phase accumulator 120, $I_n + jQ_n$ is the input signal of the phase shifter 140, n is the discrete time index in the digital implementation, $\pm f_\Delta$ is the desired positive or negative frequency shift, $f_s$ is the sampling frequency, and the output signal of the phase shifter 140, $\tilde{I}_n + j\tilde{Q}_n$, is a complex signal with a frequency shift equal to $\pm f_\Delta$ of the input signal. Without loss of generality, $f_\Delta$, $f_s$ and $\phi$ are assumed to be positive real numbers and the discrete time index, n, is assumed to be either zero or an arbitrary positive integer. To be more specific:

(a) For a positive frequency shift (when PN=0, 1-2× PN=$S_1 S_2$=1):

$$\tilde{I}_n + j\tilde{Q}_n = (I_n + jQ_n)e^{+jn\phi} \quad \text{(EQ-2a)}$$

(a) For a negative frequency shift (when PN=1, 1-2× PN=$S_1 S_2$=−1):

$$\tilde{I}_n + j\tilde{Q}_n = (I_n + jQ_n)e^{-jn\phi}. \quad \text{(EQ-2b)}$$

Two implementations of (EQ-2a) for a positive frequency shift are described in the following equations:

$$\tilde{I}_n = I_n \cos(n\phi) - Q_n \sin(n\phi) \text{ and } \tilde{Q}_n = Q_n \cos(n\phi) + I_n \sin(n\phi) \quad \text{(EQ-3a)}$$

$$\tilde{I}_n = I_n \cos(-n\phi) + Q_n \sin(-n\phi) \text{ and } \tilde{Q}_n = Q_n \cos(-n\phi) + I_n \sin(-n\phi) \quad \text{(EQ-3b)}$$

On the other hand, the implementations of (EQ-2b) for a negative frequency shift are derived as follows:

$$\tilde{I}_n = I_n \cos(n\phi) + Q_n \sin(n\phi) \text{ and } \tilde{Q}_n = Q_n \cos(n\phi) - I_n \sin(n\phi) \quad \text{(EQ-4a)}$$

$$\tilde{I}_n = I_n \cos(-n\phi) - Q_n \sin(-n\phi) \text{ and } \tilde{Q}_n = Q_n \cos(-n\phi) + I_n \sin(-n\phi) \quad \text{(EQ-4b)}$$

After applying the arithmetic properties of sine and cosine functions in (Eq-1):

$$\cos(S_2 S_1 \times n\phi) = \cos(S_1 \times n\phi), \sin(S_2 S_1 \times n\phi) = S_2 \sin(S_1 \times n\phi),$$

a general structure which includes both (EQ-3) and (EQ-4) is described as follows $$\tilde{I}_n = I_n \cos(S_1 \times n\phi) - S_2 \times Q_n \sin(S_1 \times n\phi)$$

$$\tilde{Q}_n = Q_n \cos(S_1 \times n\phi) + S_2 \times I_n \sin(S_1 \times n\phi) \quad \text{(EQ-5)}$$

where the sign indicators, $S_1$ and $S_2$, provided by the positive or negative frequency shift controller 110, is either 1 or −1. The relationship of the resulting frequency shift and the sign indicators is shown in the Table 1. According to (Eq-1), the one-bit controller determines either a positive (+$f_\Delta$>0) or a negative frequency shift (−$f_\Delta$<0) is performed. According to (Eq-3), the phase accumulation ($\theta_n$) of a positive frequency shift can be implemented from adding up a positive or a negative phase increment $\phi$, i.e., +n$\phi$ or −n$\phi$. On the other hand, the phase accumulation ($\theta_n$) of a negative frequency shift can also be implemented from adding up a positive or a negative phase increment $\phi$, i.e., +n$\phi$ or −n$\phi$, from (Eq-4). In short, (Eq-5) can perform either a positive or a negative frequency shift if the following relation holds:

$$1 - 2 \times PN = S_1 S_2, PN = 0, 1, S_1, S_2 = 1, -1.$$

Therefore, any sub-equation in (EQ-3) can be implemented as a positive frequency shifter and any sub-equation in (EQ-4) can be implemented as a negative frequency shifter. Furthermore, any sub-equation in (EQ-3) together with any sub-equation in (EQ-4) can be implemented as a frequency shifter which is capable of both positive and negative frequency shift of a signal. However, any above implementation requires a tracking of the phase accumulation, i.e., ±n$\phi$, which is output from the phase accumulator 120, can be easily implemented without the multiplication of the time index n as follows $$\theta_n = \pm n\left(\frac{2\pi f_\Delta}{f_s}\right) \equiv \pm n\phi = \theta_{n-1} \pm \phi \text{ where } \phi \equiv \frac{2\pi f_\Delta}{f_s}. \quad \text{(EQ-6)}$$

A few practical digital implementation notes are discussed in the following:

1) Since $\sin(2\pi N+\theta)=\sin\theta$ and $\cos(2\pi N+\theta)=\cos\theta$ for an arbitrary integer N, only the result after modulo $2\pi$ operation of $\theta_n$, or that after the modulo $2\pi$ operation of $n\phi$ or $-n\phi$, is required to be implemented.

2) (EQ-6) avoids the multiplication of an arbitrary integer n. However, only finite bits are allowed in the digital implementation to represent the phase increment, $\phi$. In other words, $$\phi \equiv \left(\frac{2\pi f_\Delta}{f_s}\right)_{finite-bits} + \Delta\phi_q = 2\pi\left(\frac{f_\Delta + f_s\Delta\phi_q/2\pi}{f_s}\right) \equiv \frac{2\pi(f_\Delta + \hat{f}_\Delta)}{f_s} \quad \text{(EQ-7)}$$

where $\Delta\phi_q$ is the quantization error due to the finite-bit representation. This quantization error will introduce an undesired frequency error which results an accumulated phase error $f_s$ times added after each sampling instant if it is not tracked and compensated. The required bits are proportional to the required frequency accuracy and the length of the signal, i.e., the discrete time index, n. For example, if the quantization error is required to be around one part-per-million (PPM) of the normalized sampling frequency, i.e., $\Delta\phi_q<10^{-6}$, then it will require about $\log_2(10^6)$ or 20 bits to represent just the value of $\phi$ below the decimal point. Therefore, it requires about 23 bits to represent the phase increment, $\phi$, from 0 to $2\pi$ and a 23-bit addition to obtain the phase accumulation, $\theta_n$, in (EQ-6).

3) To calculate each pair of output from (EQ-3) and (EQ-4), a pair of sine and cosine values, $\cos\theta$ and $\sin\theta$ shall be provided by the sine and cosine function calculator 130. For a high-speed implementation, i.e., $f_s \gg 1$ Hz, it is convenient to apply the Look-Up-Tables (LUTs) to obtain both sine and cosine values without extra calculations at every sampling instant.

In this case, only a finite number of entries of the LUTs are allowed to be implemented in a practical digital system. Therefore, the phase accumulation, $\theta_n$, will be further quantized to one of the available entries of the LUTs. Several, but not limited, implementations from A.1 to A.4 which are capable of both positive and negative frequency shift are illustrated in FIG. 1. The corresponding controls are listed in Table 2. According to Implementation A.1, the phase accumulation is tracked from a positive phase, $+n\phi$, only. On the other hand, the phase accumulation is tracked from a negative phase, $-n\phi$, only in the implementation A.2. Finally, the implementations A.3 and A.4 track a phase which is either positive or negative, i.e., $\pm n\phi$. These three tracking methods are the basic implementations of this invention.

Example 1

A Straight-Forward Implementation of LUTS is Described as Follows

Tables, $T[m]=\sin(m\,\pi/180)$, where $m=0, 1, 2, \ldots 90$, i.e., the quantization error $\Delta\theta_n \leq 0.5$ degree which is one-half of the smallest resolution of the LUTs. The accumulated phase increment, $\theta_n$, after the modulo $2\pi$ operation is limited to $[0, 2\pi)$. Then it is quantized to 0 to 359, i.e., $\theta_n=0, 1, 2, 3, \ldots, 359$ before applying the LUTs. A pair of sine and cosine values will be provided to calculate (EQ-3) or (EQ-4) in the following:

(a) If $0 \leq \theta_n < 90$, then
$\cos\theta_n=\sin(90-\theta_n)=T[90-\theta_n]$; where LUT index $0<90-\theta_n \leq 90$.
$\sin\theta_n=T[\theta_n]$, where LUT index $0 \leq \theta_n 90$ (b) If $90 \leq \theta_n < 180$, then
$\cos\theta_n=-\sin(\theta_n-90)=-T[\theta_n-90]$; where LUT index $0 \leq \theta_n-90<90$.
$\sin\theta_n=\sin(180-\theta_n)=T[180-\theta_n]$; where LUT index $0<180-\theta_n \leq 90$.

(c) If $180 \leq \theta_n < 270$, then
$\cos\theta_n=-\sin(270-\theta_n)=-T[270-\theta_n]$; where LUT index $0<270-\theta_n \leq 90$
$\sin\theta_n=-\sin(\theta_n-180)=-T[\theta_n-180]$; where LUT index $0 \leq \theta_n-180<90$.

(d) If $270 \leq \theta_n < 360$, then
$\cos\theta_n=\sin(\theta_n-270)=T[\theta_n-270]$; where LUT index $0 \leq \theta_n-270<90$.
$\sin\theta_n=-\sin(360-\theta_n)=-T[360-\theta_n]$; where LUT index $0<360-\theta_n \leq 90$.

The straightforward digital implementation of the conventional frequency shifter 100, however, is required a sizable memory. The required amount of memory depends on the required accuracy of the specific system. However, the benefits from reusing a larger size LUT for various communication systems will be much more desirable than the cost of the LUT in some practical implementations. Therefore, this invention provides a simple implementation with the general mathematical models to design a common front-end digital frequency shifter for various communications operating in arbitrary frequencies.

BRIEF SUMMARY OF THE INVENTION

It is an objective of the present invention to provide a programmable, digital implementation to shift an arbitrary frequency, or various frequencies (from various communication systems) of the original signal in the frequency domain. The correspondent phase accumulation (to perform the desired frequency shift) per sampling instant is perfectly tracked by counting up or down a simple integer.

To achieve the above objectives, the present invention provides several types of arbitrary frequency shifters with different mathematical models. The correspondent implementations with Look-Up-Tables (LUT) are derived for high-speed implementations without further calculations of the values of the sine and cosine functions at each sampling instant.

Furthermore, a simple shift-and-add phase rotation is described to replace the four required real multiplications. If the original complex signal contains only one-bit each from real part and imaginary part, a surprisingly simple implementation is derived for the overall arbitrary frequency shift operation. Further simplifications are found to make this invention feasible for high sampling frequencies and small frequency drifts.

BRIEF DESCRIPTION OF THE SEVERAL VIEWS OF THE DRAWINGS

The invention itself, though conceptually explained in above, can be best understood by referencing to the following description, taken in conjunction with the accompanying drawings.

DETAILED DESCRIPTION OF THE INVENTION

The accompanying drawings and the following detailed descriptions are the preferred embodiments of the present invention. It is to be understood that the following disclosed descriptions will be examples of present invention, and will not limit the present invention into the drawings and the special embodiment.

In the following discussions, a simple and perfect frequency shifter is introduced which is capable of performing an arbitrary positive or negative frequency shift and without phase accumulation errors, i.e., $\Delta\phi=\Delta\theta_n=0$. Furthermore, the phase accumulation, $\theta_n$ is simply obtained from a simple counting up or counting down of an integer. Without loss of generality, each phase increment at the sampling instant, $\phi$, is assumed to be a positive real number from (EQ-1) to (EQ-4). The correspondent phase accumulation (to perform the desired frequency shift) per sampling instant is perfectly tracked by counting up or down a simple integer.

Figure 2:
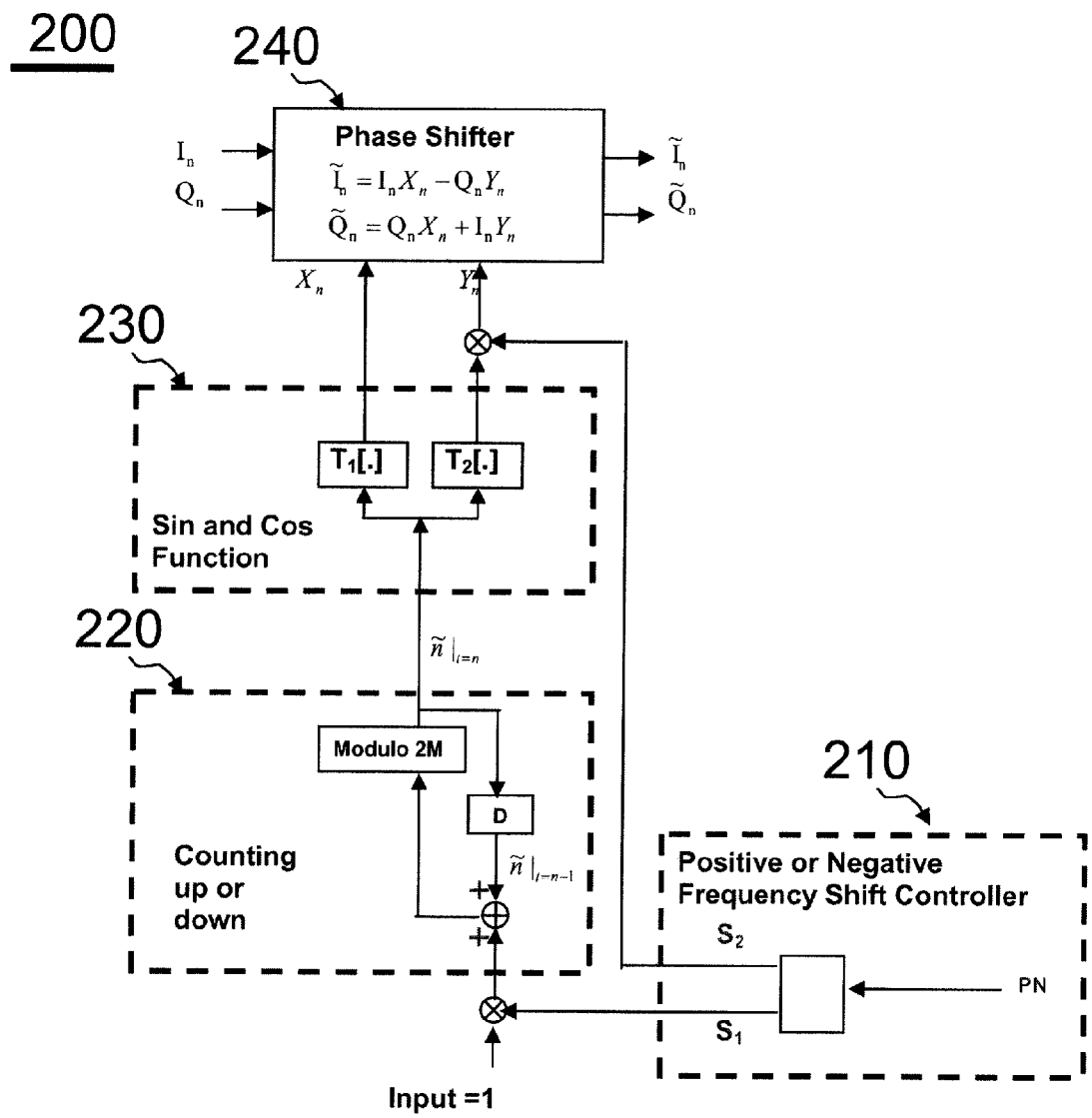
FIG. 2 shows the implementations of a TYPE B frequency shifter of the present invention.

FIG. 2 shows the implementations of a TYPE B frequency shifter of the present invention. The TYPE B frequency shifter 200 mainly comprises a positive or negative frequency shift controller 210, a counting up or down counter 220, a sine and cosine function LUTs 230 and a phase shifter 240.

The frequency shifter 200 is used to shift an arbitrary frequency of the original signal in the frequency domain. The positive or negative frequency shift controller 210 is used to provide the 1-bit controller PN which controls sign indicators $S_2$ and $S_1$. The counting up or down counter 220, receiving a phase increment per sampling instant and the sign indicator $S_1$, is used to output a reference time index, ñ, which is equivalent to a tracking of the accumulated phase increment $\theta_n$ and is obtained after a modulo 2M operation (M is assumed to be an arbitrary positive integer), to the sine and cosine function LUTs 230.

The phase increment per sampling instant of the counting up or down counter 220 is described as follows:

$$\phi = 2\pi\left(\frac{f_\Delta}{f_s}\right) = \pi\frac{F}{M} = \pi\frac{N(2M)+K}{M} = 2\pi N + \frac{K}{M}\pi$$

where $$N = \left\lfloor \frac{F}{2M} \right\rfloor = 0, 1, 2, \ldots$$

is an arbitrary non-negative integer. Without loss of generality, F, M, and K are assumed to be arbitrary positive integers. In mathematics, if the ratio, $$\frac{2f_\Delta}{f_s},$$

is a rational number, there exist two integers, F and M, and the equation, $$\frac{2f_\Delta}{f_s} = \frac{F}{M},$$

holds. Therefore, the mathematical models provided in this invention can be applied to arbitrary sampling frequencies and arbitrary frequency shifts theoretically.

The notation, $\lfloor x \rfloor$, represents the largest integer which is equal or smaller than the (positive) value x in this case. On the other hand, The notation, $\lceil x \rceil$, represents the smallest integer which is equal or larger than the (positive) value x in this case.

If F or K is zero, then phase increment, $\phi$, is zero and no frequency shift operation is required. Since K is the positive remainder of integer F after the modulo 2M operation, i.e., modulo $2\pi$; operation, K is limited from 1 to 2M−1. As mentioned above, only the phase amount after the modulo $2\pi$ operation is required to implement (EQ-3) and (EQ-4). Therefore, the following discussions in this invention will only focus on the arbitrary integers K and M, i.e., the phase increment after the modulo $2\pi$ operation. Three implementations of the counting up or down counter 220, including (a) counting up only, (b) counting down only, and (c) counting up and down, are described as follows:

(a) Counting Up Only Implementation:

$$\theta_n = [+n\phi]_{module 2\pi} = \frac{nK\pi}{M} - 2K\pi\left\lfloor\frac{n}{2M}\right\rfloor = \left(n - 2M\left\lfloor\frac{n}{2M}\right\rfloor\right)\frac{K\pi}{M} \equiv \tilde{n}\phi \quad \text{(EQ-8)}$$

where $\phi \equiv \frac{K\pi}{M}$, and $\tilde{n} = n - 2M\left\lfloor\frac{n}{2M}\right\rfloor = 0, 1, 2, \ldots, 2M-1$.

According to equation (EQ-8), a tracking of the accumulated phase increment, $\theta_n$, is equivalent to a tracking of the reference time index, ñ. This reference time index is limited from 0 to 2M−1 and only a few bits, i.e., only $\lceil\log_2(2M)\rceil$ bits are required.

For example, if K=1 and M=3, only $\lceil\log_2(2M)\rceil$ or 3 bits are enough to track the reference time index, ñ. Furthermore, the modulo $2K\pi$ operation of $\theta_n$ (or whenever $\theta_n$ is greater or equal to $2K\pi$ in this counting up implementation), is equivalent to a simple subtraction of 2M on the reference time index, ñ. In short, this is a much simpler implementation than (EQ-6).

The equivalent implementation of (EQ-8) is described as follows:

$$\tilde{n}|_{t=n} = \begin{cases} \tilde{n}|_{t=n-1} + 1, & \text{if } \tilde{n}|_{t=n-1} + 1 < 2M \\ \tilde{n}|_{t=n-1} + 1 - 2M, & \text{if } \tilde{n}|_{t=n-1} + 1 \geq 2M \end{cases} \quad \text{(EQ-9)}$$

ñ$|_{t=n}$ is the reference time index at t=n and ñ$|_{t=n-1}$ is the reference time index at t=n−1. In short, a modulo $2K\pi$ operation on the phase accumulation is equivalent to a modulo 2M operation on the reference time index.

(b) Counting Down Only Implementation:

$$\theta_n = [-n\phi]_{module 2\pi} =$$  (EQ-10)

$$2K\pi\left\lfloor\frac{n}{2M}\right\rfloor - \frac{nK\pi}{M} = \left(2M\left\lfloor\frac{n}{2M}\right\rfloor - n\right)\frac{K\pi}{M} \equiv \tilde{n}\phi;$$

where $\tilde{n} = 2M\left\lfloor\frac{n}{2M}\right\rfloor - n = 0, 1, 2, \ldots, 2M-1$.

The equivalent implementation of (EQ-10) is described as follows:

$$\tilde{n}|_{t=n} = \begin{cases} \tilde{n}|_{t=n-1} - 1, & \text{if } \tilde{n}|_{t=n-1} - 1 \geq 0 \\ \tilde{n}|_{t=n-1} - 1 + 2M, & \text{if } \tilde{n}|_{t=n-1} - 1 < 0 \end{cases}$$  (EQ-11)

In short, a modulo $2K\pi$ operation is equivalent to a modulo $2M$ operation.

(c) Counting Up and Down Implementation:

A direct implementation from both (EQ-9) and (EQ-11) is described as follows:

$$\tilde{n}|_{t=n} = \begin{cases} \tilde{n}|_{t=n-1} + S_1 - 2M, & \text{if } \tilde{n}|_{t=n-1} + S_1 \geq 2M \\ \tilde{n}|_{t=n-1} + S_1 + 2M, & \text{if } \tilde{n}|_{t=n-1} + S_1 < 0 \\ \tilde{n}|_{t=n-1} + S_1, & \text{otherwise.} \end{cases}$$  (EQ-12)

where $S_1=1$ or $S_1=-1$ if counting up or down on reference time index is required, respectively. In short, a modulo $2K\pi$ operation is equivalent to a modulo $2M$ operation.

The sine and cosine function LUTs 230, receiving the reference time index, $\tilde{n}$, is used to provide sine and cosine values to the phase shifter 240. Two LUTs are required for this implementation of the TYPE B frequency shifter 200 of the present invention:

$$T_1[m] = \cos\left(m\frac{K\pi}{M}\right); T_2[m] = \sin\left(m\frac{K\pi}{M}\right);$$  (EQ-13)

where $m = 0, 1, 2, 3, \ldots, 2M-1$.

The size of the LUTs is 2M+2M or 4M entries in total. Therefore, the pair of sine and cosine values required for (EQ-3) and (EQ-4) can be obtained from the sine and cosine function LUTs 230 as follows, $$\cos\theta_n = T_1[\tilde{n}] \text{ and } \sin\theta_n = T_2[\tilde{n}], \forall n.$$  (EQ-14)

Several, but not limited, implementations, from B.1 to B.4, which are capable of both positive and negative frequency shift are illustrated in FIG. 2. The corresponding controls are listed in Table 3.

According to Implementation B.1 and B.2, the phase accumulation is tracked only from simply counting up or down the reference time index, respectively. Implementations B.3 and B.4 track the phase accumulations from counting up and down the reference time index. The implementation of (EQ-12) is much simpler than the phase accumulation in (EQ-6). Furthermore, the phase accumulation is perfectly tracked by the reference time index (an integer) in (EQ-8) and (EQ-10) without any quantized phase error.

Finally, the phase shifter 240, receiving the sine and cosine values from the sine and cosine function LUTs 230 and the sign indicators $S_2$, is used to output a complex signal, $\tilde{I}_n+j\tilde{Q}_n$, with a frequency shift equal to $\pm f_\Delta$ of the input signal, $I_n+jQ_n$.

Figure 3:
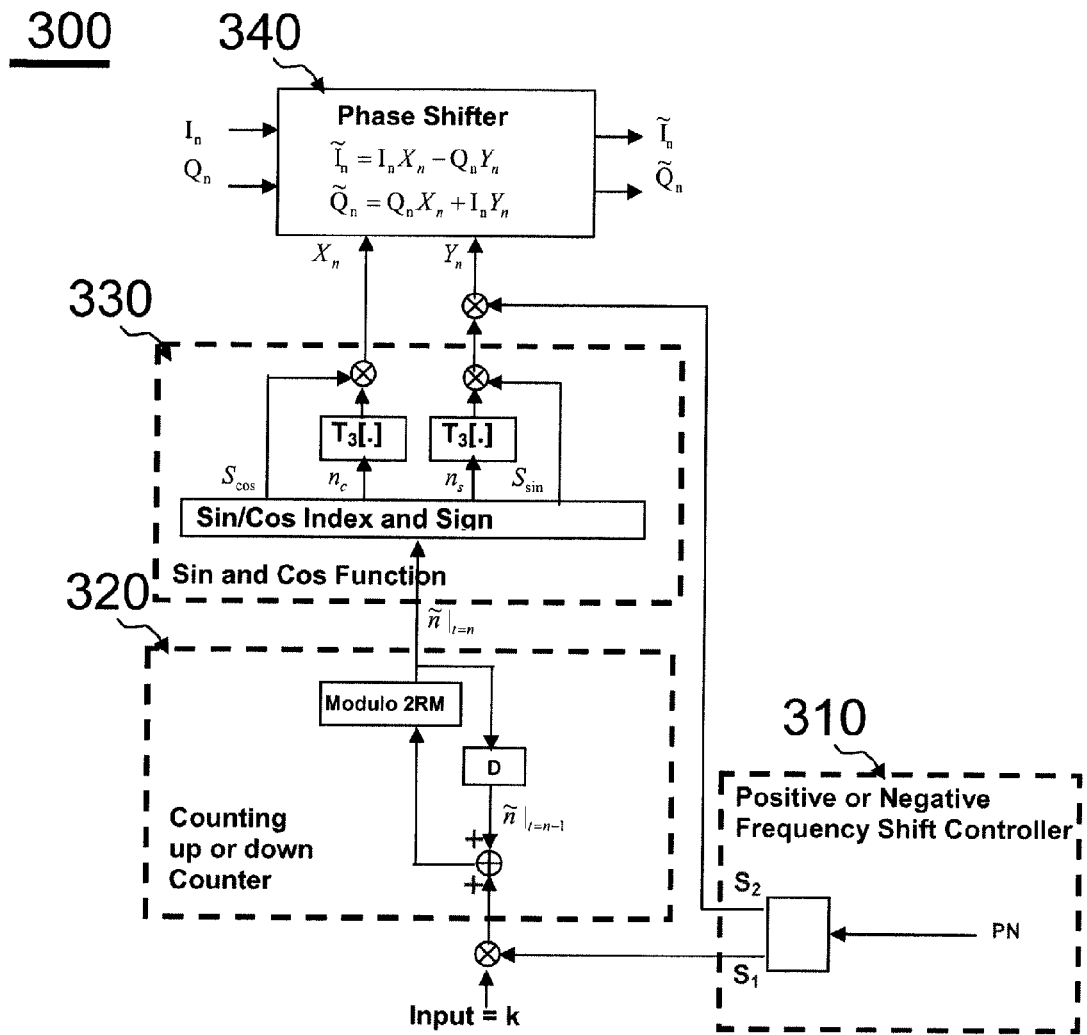
FIG. 3 shows the implementations of a TYPE C frequency shifter of the present invention.

FIG. 3 shows the implementations of a TYPE C frequency shifter of the present invention. The TYPE C frequency shifter 300 mainly comprises a positive or negative frequency shift controller 310, a counting up or down counter 320, a sine and cosine function LUTs 330 and a phase shifter 340.

Some parts of the frequency shifter 300 are similar to the corresponding parts of the frequency shifter 200. The frequency shifter 300 is used to shift an arbitrary frequency of the original signal in the frequency domain. The positive or negative frequency shift controller 310 is used to provide the 1-bit controller PN which controls sign indicators $S_2$ and $S_1$. The counting up or down counter 320, receiving a phase increment per sampling instant and the sign indicator $S_1$, is used to output a reference time index, $\tilde{n}$, which is equivalent to a tracking of the accumulated phase increment $\theta_n$ and is obtained with a modulo 2RM operation (R, is either 1 or 2), to the sine and cosine function LUTs 330.

The phase increment per sampling instant of the counting up or down counter 320 is described as follows:

$$\phi = 2\pi\left(\frac{f_\Delta}{f_s}\right) = \pi\frac{F}{RM} = \pi\frac{N(2RM)+K}{RM} = 2\pi N + \frac{K}{RM}\pi.$$

Here $N = \left\lfloor\frac{F}{2RM}\right\rfloor = 0, 1, 2, \ldots$ is an arbitrary non-negative integer. Without loss of generality, F, M, and K are assumed to be arbitrary positive integers, and the type integer, R, is either 1 or 2 for TYPE B1 and TYPE B2, respectively.

After the modulo $2\pi$ operation, the phase increment per sampling instant, $$\phi = 2\pi\left(\frac{f_\Delta}{f_s}\right) = \frac{K\pi}{RM}.$$

Since K is the positive remainder of integer F after the modulo 2RM operation, i.e., modulo $2\pi$, operation, K is limited from 1 to 2RM−1. As mentioned above, only the phase amount after the modulo $2\pi$ operation is required to implement (EQ-3) and (EQ-4). In additions, TYPE C1 (or R=1) is the universal set that includes all the possible real numbers of the phase increment, $\phi$. On the other hand, TYPE C2 (or R=2) is a subset of TYPE C1 in which the denominator is an even integer. It will be shown in the later discussions that the size of the required LUT of TYPE C2 is only one-half of that of the TYPE C1.

Three implementations of the counting up or down counter 320, including (a) counting up only, (b) counting down only, and (c) counting up and down, are described as follows:

(a) Counting Up Only Implementation:

$$\theta_n = [+n\phi]_{module 2\pi} = \frac{nK\pi}{M} - 2K\pi\left\lfloor\frac{n}{\left(\frac{2RM}{K}\right)}\right\rfloor \equiv \frac{nK\pi}{RM} - 2\pi M_{up} =$$  (EQ-15)

$$(nK - 2RMM_{up})\frac{\pi}{RM} = \tilde{n}\tilde{\phi}$$

where $\tilde{n} \equiv nK - 2RMM_{up}$, $\tilde{\phi} \equiv \frac{\pi}{RM}$, and $M_{up} \equiv \left\lfloor\frac{n}{\left(\frac{2RM}{K}\right)}\right\rfloor$, $$0 \leq \theta_n = [+n\phi]_{module2\pi} < 2\pi \Rightarrow 0 \leq \tilde{n}\frac{\pi}{RM} < 2\pi \Rightarrow 0 \leq \tilde{n} < 2RM,$$

i.e., $\tilde{n} = 0, 1, 2, \ldots, 2RM - 1$.

Similarly to the derivations in TYPE B, the tracking of phase accumulation is equivalent to the tracking of the reference time index, $\tilde{n}$, i.e., $$\theta_n = \theta_{n-1} + \phi \Rightarrow \tilde{n}|_{t=n} = \quad \text{(EQ-16)}$$

$$\begin{cases} \tilde{n}|_{t=n-1} + K, & \text{if } \tilde{n}|_{t=n-1} + K < 2RM \\ \tilde{n}|_{t=n-1} + K - 2RM, & \text{if } \tilde{n}|_{t=n-1} + K \geq 2RM \end{cases}$$

Therefore, if $\tilde{n} \geq 2RM$, then $\theta_n = \tilde{n}\tilde{\phi} \geq 2\pi$. In other words, if the reference time index is equal or greater than 2RM, a modulo $2\pi$ operation (which is equivalent a subtraction of 2RM) is required. Both TYPE B and TYPE C have the same phase increment $\phi$. However, the modulo operation is performed every $2\pi$ in (EQ-15) but not $2K\pi$ in (EQ-8). Therefore, the equivalent phase tracking shown in (EQ-16) is K times faster than (EQ-9).

(b) Counting Down Only Implementation:

$$\theta_n = [-n\phi]_{module2\pi} = 2\pi \left\lfloor \frac{n}{\left(\frac{2RM}{K}\right)} \right\rfloor - \frac{nK\pi}{M} \equiv 2\pi M_{down} - \frac{nK\pi}{M} = \quad \text{(EQ-17)}$$

$$(2RMM_{down} - nK)\frac{\pi}{RM} = \tilde{n}\tilde{\phi};$$

where $\tilde{n} \equiv 2RMM_{down} - nK$, $\tilde{\phi} \equiv \frac{\pi}{RM}$, and $M_{down} \equiv \left\lfloor \frac{n}{\left(\frac{2RM}{K}\right)} \right\rfloor$, $$0 \leq \theta_n = [-n\phi]_{module2\pi} < 2\pi \Rightarrow 0 \leq \tilde{n}\frac{\pi}{RM} < 2\pi \Rightarrow 0 \leq \tilde{n} < 2RM,$$

i.e., $\tilde{n} = 0, 1, 2, \ldots, 2RM - 1$.

The tracking of phase accumulation is equivalent to the tracking of the reference time index, $\tilde{n}$, i.e., $$\theta_n = \quad \text{(EQ-18)}$$

$$\theta_{n-1} - \phi \Rightarrow \tilde{n}|_{t=n} = \begin{cases} \tilde{n}|_{t=n-1} - K, & \text{if } \tilde{n}|_{t=n-1} - K \geq 0 \\ (\tilde{n}|_{t=n-1} - K) + 2RM, & \text{if } \tilde{n}|_{t=n-1} - K < 0 \end{cases}$$

Therefore, if $\tilde{n}<0$, then $\theta_n = \tilde{n}\tilde{\phi}<0$. In other words, if the reference time index is smaller than zero, a modulo $2\pi$ operation (which is equivalent an addition of 2RM) is required.

(c) Counting Up and Down Implementation:

A direct implementation from both (EQ-16) and (EQ-18) is described as follows:

$$\tilde{n}|_{t=n} = \begin{cases} \tilde{n}|_{t=n-1} + S_1 \times K - 2RM, & \text{if } \tilde{n}|_{t=n-1} + S_1 \times K \geq 2RM \\ \tilde{n}|_{t=n-1} + S_1 \times K + 2RM, & \text{if } \tilde{n}|_{t=n-1} + S_1 \times K < 0 \\ \tilde{n}|_{t=n-1} + S_1 \times K, & \text{otherwise.} \end{cases} \quad \text{(EQ-19)}$$

where the reference time index, $\tilde{n}=0, 1, 2, \ldots, 2RM-1$ and the phase increment per sampling, $S_1=1$ or $S_1=-1$, if counting up or down on reference time index is required, respectively. In short, a modulo $2\pi$ operation is equivalent to a modulo 2RM operation.

For the above three implementations, this reference time index is limited from 0 to 2RM−1 and only a few bits, i.e., only $\lceil \log_2(2RM) \rceil$ bits are required. Similar to the discussions in TYPE B, the modulo $2\pi$ operation of $\theta_n$, is equivalent to a simple subtraction or addition of 2RM on the reference time index, $\tilde{n}$. In short, this is a much simpler implementation than (EQ-6).

The sine and cosine function LUTs 330, receiving the reference time index, $\tilde{n}$, is used to provide sine and cosine values to the phase shifter 340. A simpler implementation of LUTs than TYPE B is described as follows. The integer value of the reference time index (after the modulo 2RM operation) must be in one of the following four partitions:

(a) $0 \leq \theta_n < \pi/2 \Rightarrow 0 \leq \tilde{n}\tilde{\phi} < \pi/2 \Rightarrow 0 \leq \tilde{n}$ (EQ-20)

$$\frac{\pi}{RM} < \pi/2 \Rightarrow 0 \leq \tilde{n} < \frac{RM}{2}$$

$$C_n \equiv \cos\theta_n = \sin\left(\frac{\pi}{2} - \theta_n\right) = \sin\left[\left(M - \frac{2}{R}\tilde{n}\right)\frac{\pi}{2M}\right] =$$

$$T_3\left[M - \frac{2}{R}\tilde{n}\right];$$

where $0 < M - \frac{2}{R}\tilde{n} \leq M$ $$S_n \equiv \sin\theta_n = \sin\left(\tilde{n}\frac{\pi}{M}\right) = \sin\left[\frac{2}{R}\tilde{n}\frac{\pi}{2M}\right] = T_3\left[\frac{2}{R}\tilde{n}\right];$$

where $0 \leq \frac{2}{R}\tilde{n} < M$ (b) $\pi/2 \leq \theta_n < \pi \Rightarrow \frac{RM}{2} \leq \tilde{n} < \frac{2RM}{2}$ -continued $$C_n \equiv \cos\theta_n =$$

$$-\sin\left(\theta_n - \frac{\pi}{2}\right) = -\sin\left[\left(\frac{2}{R}\tilde{n} - M\right)\frac{\pi}{2M}\right] = -T_3\left[\frac{2}{R}\tilde{n} - M\right];$$

where $0 \leq \frac{2}{R}\tilde{n} - M < M$ $$S_n \equiv \sin\theta_n = \sin(\pi - \theta_n) = \sin\left[\left(2M - \frac{2}{R}\tilde{n}\right)\frac{\pi}{2M}\right] = T_3\left[2M - \frac{2}{R}\tilde{n}\right];$$

where $0 < 2M - \frac{2}{R}\tilde{n} \leq M$ (c) $\pi \leq \theta_n < 3\pi/2 \Rightarrow \frac{2RM}{2} \leq \tilde{n} < \frac{3RM}{2}$ $$C_n \equiv \cos\theta_n = -\sin\left(\frac{3\pi}{2} - \theta_n\right) = -\sin\left[\left(3M - \frac{2}{R}\tilde{n}\right)\frac{\pi}{2M}\right] = -T_3\left[3M - \frac{2}{R}\tilde{n}\right];$$

where $0 < 3M - \frac{2}{R}\tilde{n} \leq M$ $$S_n \equiv \sin\theta_n = -\sin(\theta_n - \pi) = -\sin\left[\left(\frac{2}{R}\tilde{n} - 2M\right)\frac{\pi}{2M}\right] = -T_3\left[\frac{2}{R}\tilde{n} - 2M\right];$$

where $0 \leq \frac{2}{R}\tilde{n} - 2M < M$ (d) $3\pi/2 \leq \theta_n < 2\pi \Rightarrow \frac{3RM}{2} \leq \tilde{n} < \frac{4RM}{2}$ $$C_n \equiv \cos\theta_n = \sin\left(\theta_n - \frac{3\pi}{2}\right) = \sin\left[\left(\frac{2}{R}\tilde{n} - 3M\right)\frac{\pi}{2M}\right] = T_3\left[\frac{2}{R}\tilde{n} - 3M\right];$$

where $0 \leq \frac{2}{R}\tilde{n} - 3M < M$ $$S_n \equiv \sin\theta_n = -\sin(2\pi - \theta_n) = -\sin\left[\left(4M - \frac{2}{R}\tilde{n}\right)\frac{\pi}{2M}\right] = -T_3\left[4M - \frac{2}{R}\tilde{n}\right];$$

where $0 < 4M - \frac{2}{R}\tilde{n} \leq M$

In short, (a) $0 \leq \tilde{n} < \frac{RM}{2} \Rightarrow S_{cos} = +1, S_{sin} = +1,$  (EQ-21)

$n_c = M - \frac{2}{R}\tilde{n}; n_s = \frac{2}{R}\tilde{n}$ (b) $\frac{RM}{2} \leq \tilde{n} < \frac{2RM}{2} \Rightarrow S_{cos} = -1, S_{sin} = +1,$ $n_c = \frac{2}{R}\tilde{n} - M; n_s = 2M - \frac{2}{R}\tilde{n}$ (c) $\frac{2RM}{2} \leq \tilde{n} < \frac{3RM}{2} \Rightarrow S_{cos} = -1, S_{sin} = -1,$ $n_c = 3M - \frac{2}{R}\tilde{n}; n_s = \frac{2}{R}\tilde{n} - 2M$ (d) $\frac{3RM}{2} \leq \tilde{n} < \frac{4RM}{2} \Rightarrow S_{cos} = +1, S_{sin} = -1,$ $n_c = \frac{2}{R}\tilde{n} - 3M; n_s = 4M - \frac{2}{R}\tilde{n};$ The original LUT index, $n_c$ or $n_s$, is equivalent to the original index, n, for cosine and sine in (EQ-21) and then calculated separately. The required sine and cosine function LUTs 330 is listed as follows:

$$T_3[m] = \sin\left[m\frac{\pi}{2M}\right], m = 0, 1, 2, 3, \ldots, M \quad \text{(EQ-22)}$$

From (EQ-20), only one LUT, $T_3$, is required. Furthermore, the index of the LUT is ranging from 0 to M, i.e., the size of the LUT is M+1 only. In comparison, the TYPE B requires two LUTs ($T_1$ and $T_2$) and the total size is 4M in total. Therefore (EQ-21) is a much simple and cost-efficient implementation than (EQ-14).

In short, for the same integer K, the size of the required sine and cosine function LUTs 330 is the same, i.e., M+1 entries, for both TYPE C1 and TYPE C2. Therefore, if the denominator, RM, is an odd integer, i.e., TYPE B1 with R=1, the size of the required sine and cosine function LUTs 330 has M+1 entries. For TYPE B2 with R=2, the denominator is 2M and the size of the required the sine and cosine function LUTs 330 has only M+1 entries.

According to the above discussions, for a fixed sampling rate, i.e., M, only one LUT is sufficient for an arbitrary integer K, i.e., an arbitrary positive or negative frequency shift from these simple and perfect phase accumulation tracking implementations no matter it is TYPE C1 or TYPE C2.

It is observed from the above equations: the size of the required LUT is proportional to the integer value of the denominator. Therefore, although the derivations in TYPE C do include all arbitrary positive integers for M and K, one should cancel out all common factors among M and K when applying (EQ-15)-(EQ-22). Furthermore, if the total denominator, RM, is an even integer, one should apply the TYPE C2 equations with R=2 resulting a LUT containing RM/2+1=M+1 entries. Of course, one can select R=1 in this case but this will result a LUT with a size equals to RM+1=2M+1.

In summary, one should cancel out all common factors among the frequency shift and the sampling frequency, i.e., 2$f_\Delta$ and $f_s$ in (EQ-15). Then if the total denominator, $M_{tot}$=R×M, is an even integer, assign R=2. On the other hand, if the total denominator is an odd number, then assign R=1.

Several, but not limited, implementations from C.1 to C.4 which are capable of both positive and negative frequency shift are illustrated in FIG. 3. The corresponding controls are listed in Table 4.

Finally, the phase shifter 340, receiving the sine and cosine values from the sine and cosine function LUTs 330 and the sign indicators $S_2$, is used to output a complex signal, $\tilde{I}_n + j\tilde{Q}_n$, with a frequency shift equal to $\pm f_\Delta$ of the input signal, $I_n + jQ_n$.

The important applications from TYPE B frequency shifter 200 of the present invention are described in the following examples.

Example 2

A TYPE B Implementation $$f_s = 7 \text{ MHz}, \phi = 2\pi\left(\frac{f_\Delta}{f_s}\right) = 2\pi\left(\frac{\pm 7N \pm 1.5}{7}\pi\right) = \left(\frac{\pm 14N \pm 3}{7}\pi\right),$$

where frequency shift $f_\Delta = (\pm 7N \pm 1.5)$ MHz and

N is an arbitrary positive integer. Obviously, K=3 and M=7 in this example.

The reference time index is found as follows:

$$\tilde{n}|_{t=n} = \begin{cases} \tilde{n}|_{t=n-1} + S_1 - 14, & \text{if } \tilde{n}|_{t=n-1} + S_1 \geq 14 \\ \tilde{n}|_{t=n-1} + S_1 + 14, & \text{if } \tilde{n}|_{t=n-1} + S_1 < 0 \\ \tilde{n}|_{t=n-1} + S_1, & \text{otherwise.} \end{cases}$$

where $S_1=1$ or $S_1=-1$ if counting up or counting down is required, respectively.

In short, a modulo $2K\pi$ (or $6\pi$) operation is equivalent to a modulo 2M (or 14) operation.

The required two LUT are found as follows:

$$T_1[m] = \cos\left(m\frac{K\pi}{M}\right) = \cos\left(m\frac{3\pi}{7}\right), m = 0, 1, 2, \ldots, 13. \quad \text{(EQ-23)}$$

$$T_2[m] = \sin\left(m\frac{K\pi}{M}\right) = \sin\left(m\frac{3\pi}{7}\right), m = 0, 1, 2, \ldots, 13.$$

And the required cos and sin function values to calculate (EQ-3) or (EQ-4) are shown as follows.

$$\cos \theta_n = T_1[\tilde{n}] \text{ and } \sin \theta_n = T_2[\tilde{n}], \forall n.$$

The size of the required LUT is 4M=28 entries. In this example, the two LUTs are specially designed for a particular K=3 only. If another desired frequency shift (i.e., a different K) is required, another two LUTs in (EQ-23) are required for this implementation.

Some important applications from TYPE C frequency shifter 300 of the present invention are described in the following examples.

Example 3

An Implementation of TYPE C1 Frequency Shifter 300 of the Present Invention with R=1

$$f_s = 7 \text{ MHz}, \quad \text{(EQ-24)}$$

$$\phi = 2\pi\left(\frac{f_\Delta}{f_s}\right) = 2\pi\left(\frac{\pm 7N \pm K \times 0.5}{7}\pi\right) = \left(\frac{\pm 14N \pm K}{7}\pi\right),$$

where arbitrary $f_\Delta = (\pm 7N \pm K \times 0.5) = \hat{K} \times 0.5 = 0, \pm 0.5, \pm 1, \pm 1.5, \pm 2, \pm 2.5, \ldots$, MHz, N is an arbitrary positive integer, K is an arbitrary integer between 0 and 13, and $\hat{K}$ is an arbitrary integer (from the smallest integer to the largest one in theory). Obviously, R=1 and M=7 in this example. In short, by controlling integer K from 0 to 13, an arbitrary frequency shift which is an integer multiple of 0.5 MHz can be achieved. The reference time index is found as follows:

$$\tilde{n}|_{t=n} = \begin{cases} \tilde{n}|_{t=n-1} + S_1 \times K - 14, & \text{if } \tilde{n}|_{t=n-1} + S_1 \times K \geq 14 \\ \tilde{n}|_{t=n-1} + S_1 \times K + 14, & \text{if } \tilde{n}|_{t=n-1} + S_1 \times K < 0 \\ \tilde{n}|_{t=n-1} + S_1 \times K, & \text{otherwise.} \end{cases} \quad \text{(EQ-25)}$$

where $S_1=1$ or $S_1=-1$ if counting up or counting down is required, respectively.

In short, a modulo $2\pi$ operation is equivalent to a modulo 2RM (or 14) operation. The required one LUT is found as follows:

$$T_3[m] = \sin\left(m\frac{\pi}{2 \times 7}\right) = \sin\left(m\frac{\pi}{14}\right), m = 0, 1, 2, \ldots 7. \quad \text{(EQ-26)}$$

And the required cos and sin values to calculate (EQ-3) or (EQ-4) are shown as follows.

(a) $0 \leq \tilde{n} < \frac{7}{2} \Rightarrow S_{cos} = +1, S_{sin} = +1, n_c = 7 - 2\tilde{n};$ (EQ-27)

$n_s = 2\tilde{n}$ (b) $\frac{7}{2} \leq \tilde{n} < \frac{14}{2} \Rightarrow S_{cos} = -1, S_{sin} = +1, n_c = 2\tilde{n} - 7;$ $n_s = 14 - 2\tilde{n}$ (c) $\frac{14}{2} \leq \tilde{n} < \frac{21}{2} \Rightarrow S_{cos} = -1, S_{sin} = -1, n_c = 21 - 2\tilde{n};$ $n_s = 2\tilde{n} - 14$ (d) $\frac{21}{2} \leq \tilde{n} < \frac{28}{2} \Rightarrow S_{cos} = +1, S_{sin} = -1, n_c = 2\tilde{n} - 21;$ $n_s = 28 - 2\tilde{n};$ The size of the required LUT is 7+1=8 entries. The desired frequency shift can be an arbitrary (positive or negative) integer multiple of 0.5 MHz if the sampling rate is fixed at 7 MHz. Therefore, with only one set of LUT in (EQ-26), just counting an arbitrary integer $\pm K$ in (EQ-25) will provide an arbitrary frequency shift at $(\pm 7N \pm K \times 0.5)$ MHz, respectively.

In other words, this is a very simple and programmable frequency shifter with great flexibility in shifting various frequencies.

Example 4

An Implementation of TYPE C2 Frequency Shifter 300 of the Present Invention with R=2

$$f_s = 14 \text{ MHz}, \qquad \text{(EQ-28)}$$

$$\phi = 2\pi\left(\frac{f_\Delta}{f_s}\right) = 2\pi\left(\frac{\pm 14N \pm K \times 0.5}{14}\pi\right) = \left(\frac{\pm 28N \pm K}{2 \times 7}\pi\right),$$

where arbitrary $f_\Delta = (\pm 28N \pm K \times 0.5) = \hat{K} \times 0.5 = 0, \pm 0.5, \pm 1, \pm 1.5, \pm 2, \pm 2.5, \ldots,$ MHz N is an arbitrary positive integer, K is an arbitrary integer between 0 and 27, and $\hat{K}$ is an arbitrary integer. Obviously, R=2 and M=7 in this example. In short, by controlling integer K from 0 to 27, an arbitrary frequency shift which is an integer multiple of 0.5 MHz. The reference time index is found as follows:

$$\tilde{n}|_{t=n} = \begin{cases} \tilde{n}|_{t=n-1} + S_1 \times K - 28, & \text{if } \tilde{n}|_{t=n-1} + S_1 \times K \geq 28 \\ \tilde{n}|_{t=n-1} + S_1 \times K + 28, & \text{if } \tilde{n}|_{t=n-1} + S_1 \times K < 0 \\ \tilde{n}|_{t=n-1} + S_1 \times K, & \text{otherwise.} \end{cases} \quad \text{(EQ-29)}$$

where $S_1=1$ or $S_1=-1$ if counting up or counting down is required, respectively.

In short, a modulo $2\pi$ operation is equivalent to a modulo 2RM (or 28) operation. The required one LUT is the same as (EQ-26):

$$T_3[m] = \sin\left(m\frac{\pi}{2 \times 7}\right) = \sin\left(m\frac{\pi}{14}\right), \quad m = 0, 1, 2, \ldots 7. \quad \text{(EQ-30)}$$

And the required cos and sin values to calculate (EQ-3) or (EQ-4) are shown as follows.

(a) $0 \leq \tilde{n} < 7 \Rightarrow S_{cos}=+1, S_{sin}=+1, n_c=7-\tilde{n}; n_s=\tilde{n}$ (b) $7 \leq \tilde{n} < 14 \Rightarrow S_{cos}=-1, S_{sin}=+1, n_c=\tilde{n}-7; n_s=14-\tilde{n}$ (c) $14 \leq \tilde{n} < 21 \Rightarrow S_{cos}=-1, S_{sin}=-1, n_c=21-\tilde{n}; n_s=\tilde{n}-14$ (d) $21 \leq \tilde{n} < 28 \Rightarrow S_{cos}=+1, S_{sin}=-1, n_c=\tilde{n}-21; n_s=28-\tilde{n};$ (EQ-31)

The size of the required LUT is 7+1=8 entries. The desired frequency shift can be an arbitrary (positive or negative) integer multiple of 0.5 MHz if the sampling rate is fixed at 14 MHz. Therefore, with only one set of LUT in (EQ-30), just counting an arbitrary integer ±K in (EQ-29) will provide an arbitrary frequency shift at ±0.14N±K×0.5) MHz, respectively. In other words, this is a very simple and programmable frequency shifter with great flexibility in shifting various frequencies. In this example, the denominator is an even number. Therefore, the size of the required LUT is the same for $f_s=7$ MHz (Example 3) and $f_s=14$ MHz (Example 4).

Example 5

Another Implementation of TYPE C2 Frequency Shifter 300 of the Present Invention with R=2

$$f_s = 14 \text{ MHz},$$

$$\phi = 2\pi\left(\frac{f_\Delta}{f_s}\right) = 2\pi\left(\frac{\pm 14N \pm K \times 0.05}{14}\pi\right) = \left(\frac{\pm 280N \pm K}{2 \times 70}\pi\right),$$

where arbitrary $f_\Delta = (\pm 14N \pm K \times 0.05) = \hat{K} \times 0.05 = 0, \pm 0.05, \pm 0.1, \pm 0.15, \pm 0.2, \pm 0.25, \ldots,$ MHz N is an arbitrary positive integer, K is an arbitrary integer between 0 and 279, and $\hat{K}$ is an arbitrary integer. In short, by controlling integer K from 0 to 279, an arbitrary frequency shift which is an integer multiple of 0.05 MHz.

The required LUT is shown as follows:

$$T[m] = \sin\left(m\frac{\pi}{2 \times 70}\right) = \sin\left(m\frac{\pi}{140}\right), m = 0, 1, 2, 3, 4, \ldots, 70.$$

The required LUT has 71 entries which are almost 10 times when comparing with 8 entries in Example 4. The desired frequency shift can be an arbitrary (positive or negative) integer multiple of 0.05 MHz. Therefore, the resolution is 10 times more precise or flexible than 0.5 MHz in Example 4.

The implementations of Examples 3 to 5 are surprisingly easy. With the advanced neon-technology, the size of the LUT will become less significant. The benefits from reusing a larger size LUT for various communication systems are much more desirable than the cost of the LUT. It is clearly that this invention provides a simple implementation and the general mathematical models to design a common front-end digital frequency shifter for various communications operating in arbitrary frequencies.

To implement any sub-equation in (EQ-3) or (EQ-4), four real multiplications and two real additions are required. Another method to avoid the multiplications is described as follows. Assume the input signal has a finite bit width, $N_{IQ}$ for both $I_n$ and $Q_n$, of the phase shifter 340, then the binary representation of the input signal is described as follows.

$$I_n = \sum_{k=0}^{N_{IQ}-1} I_{n,k} 2^k \text{ and } Q_n = \sum_{k=0}^{N_{IQ}-1} Q_{n,k} 2^k \quad \text{(EQ-32)}$$

where $I_{n,k}, Q_{n,k} = 0$ or $1, \forall k = 0, 1, \ldots, N_{IQ}-1$.

Therefore, (EQ-3a) is equivalent to $$\tilde{I}_n = I_n \cos(n\phi) - Q_n \sin(n\phi) = \sum_{k=0}^{N_{IQ}-1} [I_{n,k} \cos(n\phi) - Q_{n,k} \sin(n\phi)]2^k =$$

$$\sum_{k=0}^{N_{IQ}-1} \{[I_{n,k} \cos(n\phi) - Q_{n,k} \sin(n\phi)] << k\}$$

and $$\tilde{Q}_n = \qquad \text{(EQ-33a)}$$

$$Q_n\cos(n\phi) + I_n\sin(n\phi) = \sum_{k=0}^{N_{IQ}-1}[Q_{n,k}\cos(n\phi) + I_{n,k}\sin(n\phi)]2^k =$$

$$\sum_{k=0}^{N_{IQ}-1}\{[I_{n,k}\cos(n\phi) - Q_{n,k}\sin(n\phi)] << k\}$$

Similarly, sub-equations (EQ-3b), (EQ-4a), and (EQ-4b), are equivalent to (EQ-33b), (EQ-34a), and (EQ-34b), respectively:

$$\tilde{I}_n = I_n\cos(-n\phi) + Q_n\sin(-n\phi) = \qquad \text{(EQ-33b)}$$

$$\sum_{k=0}^{N_{IQ}-1}\{[I_{n,k}\cos(-n\phi) + Q_{n,k}\sin(-n\phi)] << k\}$$

$$\tilde{Q}_n = Q_n\cos(-n\phi) - I_n\sin(-n\phi) =$$

$$\sum_{k=0}^{N_{IQ}-1}\{[Q_{n,k}\cos(-n\phi) - I_{n,k}\sin(-n\phi)] << k\}$$

$$\tilde{I}_n = I_n\cos(n\phi) + Q_n\sin(n\phi) = \qquad \text{(EQ-34a)}$$

$$\sum_{k=0}^{N_{IQ}-1}\{[I_{n,k}\cos(n\phi) + Q_{n,k}\sin(n\phi)] << k\}$$

$$\tilde{Q}_n = Q_n\cos(n\phi) - I_n\sin(n\phi) =$$

$$\sum_{k=0}^{N_{IQ}-1}\{[Q_{n,k}\cos(n\phi) - I_{n,k}\sin(n\phi)] << k\}$$

$$\tilde{I}_n = I_n\cos(-n\phi) - Q_n\sin(-n\phi) = \qquad \text{(EQ-34b)}$$

$$\sum_{k=0}^{N_{IQ}-1}\{[I_{n,k}\cos(-n\phi) - Q_{n,k}\sin(-n\phi)] << k\}$$

$$\tilde{Q}_n = Q_n\cos(-n\phi) + I_n\sin(-n\phi) =$$

$$\sum_{k=0}^{N_{IQ}-1}\{[Q_{n,k}\cos(-n\phi) + I_{n,k}\sin(-n\phi)] << k\}$$

Since each bit of $I_n$ or $Q_n$ from Less-Significant-Bit (LSB) to Most-Significant-Bit (MSB) is either 1 or 0, only simple shift-and-add operations are required for the phase shifter 340. This is especially useful for some applications in which only a few bits are required for $I_n$ and $Q_n$.

For some specific implementations, only one bit is required for $I_n$ and $Q_n$. The one-bit $I_n$ or $Q_n$ is either 0 or 1 representing a integer value either +1 or −1 as the input to the next digital module. In this case, (EQ-2) and (EQ-3) become as follows:

$$\tilde{I}_n + j\tilde{Q}_n \equiv (I_n + jQ_n)e^{\pm jn\phi} = \qquad \text{(EQ-35)}$$

$$\sqrt{2}\,e^{j\left(\frac{\alpha_n\pi}{2}+\frac{\pi}{4}\right)}e^{\pm jn\phi} = \sqrt{2}\,e^{j\left(\frac{\alpha_n\pi}{2}+\frac{\pi}{4}\right)\pm n\phi}$$

Where the mapping factor $$\alpha_n = \begin{cases} 0; & \text{if } I_n = +1, \ Q_n = +1 \\ 1; & \text{if } I_n = -1, \ Q_n = +1 \\ 2; & \text{if } I_n = -1, \ Q_n = -1 \\ 3; & \text{if } I_n = +1, \ Q_n = -1 \end{cases}$$

Since the scalar, $\sqrt{2}$, does not affect the further processing in the digital implementation, the overall frequency shift operation in (EQ-35) is just a phase shift includes (a) the phase of the complex signal, $I_n+jQ_n$ plus (b) the equivalent phase accumulation $\pm n\phi$, which is correspondent to the desired frequency shift, at each sampling instant. In other words, redefined the output of the frequency shifter as follows:

$$\tilde{I}_n + j\tilde{Q}_n \equiv \frac{1}{\sqrt{2}}(I_n + jQ_n)e^{\pm jn\phi} \equiv e^{j(\lambda_n \pm n\phi)} \qquad \text{(EQ-36)}$$

where $\lambda_n \equiv \frac{\pi}{4} + \alpha_n\frac{\pi}{2}; \ \alpha_n = 0, 1, 2, 3, \text{ and } 0 \le \lambda_n < 2\pi.$ This is a much simpler calculation avoid the four full real multiplications and two additions in (EQ-3) or (EQ-4). The details of this special implementation are described as follows.

Figure 4:
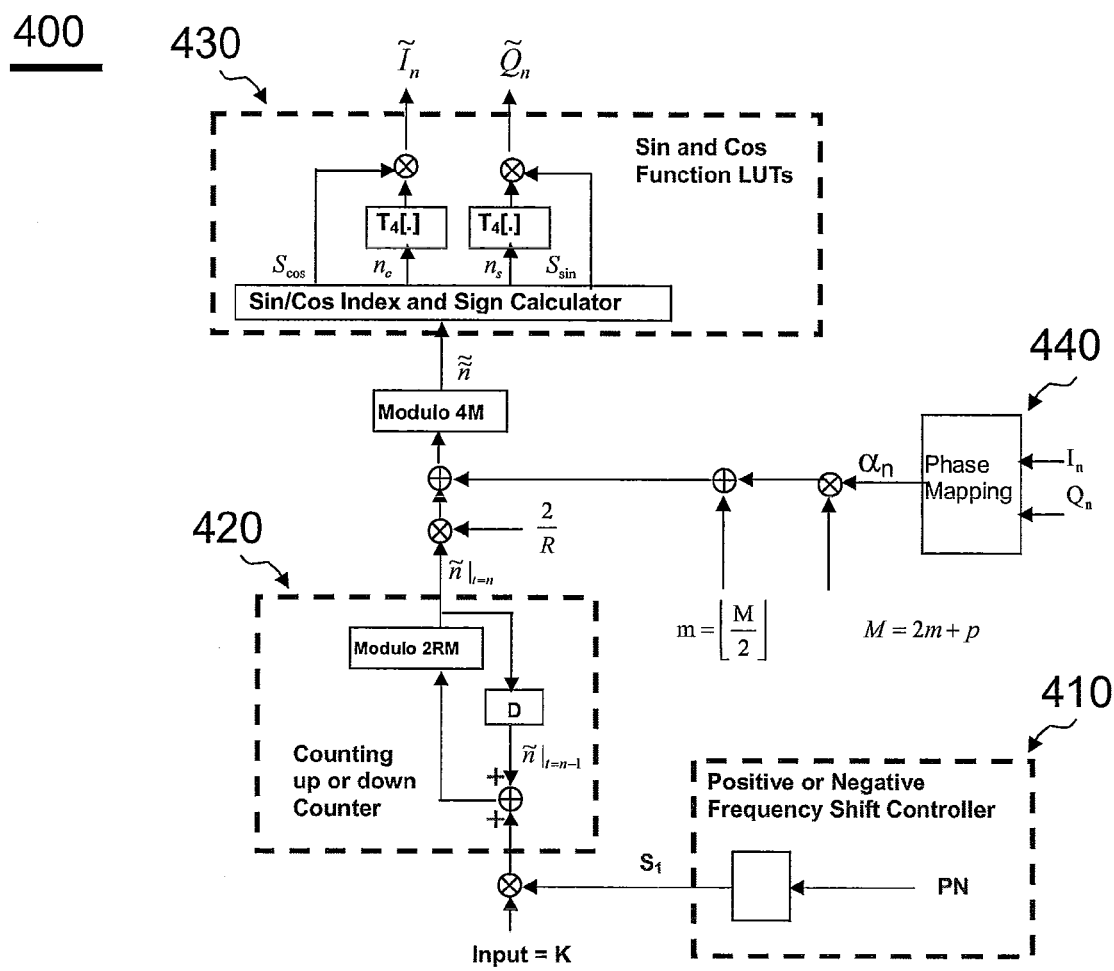
FIG. 4 shows the implementations of a TYPE D frequency shifter of the present invention.

FIG. 4 shows the implementations of a TYPE D frequency shifter of the present invention. The TYPE D frequency shifter 400 mainly comprises a positive or negative frequency shift controller 410, a counting up or down counter 420, a sine and cosine function LUTs 430 and a phase mapping device 440. The frequency shifter 400 is used to shift an arbitrary frequency of the original signal in the frequency domain. The positive or negative frequency shift controller 410 is used to provide the 1-bit controller PN which controls sign indicators $S_2$ and $S_1$. The counting up or down counter 420, receiving a phase increment per sampling instant and the sign indicator $S_1$, is used to output a reference time index, $\tilde{n}$, which is equivalent to a tracking of the accumulated phase increment $\theta_n$ and is obtained with a modulo 2RM operation, to the sine and cosine function LUTs 430. The phase mapping device 440, receiving the input signal, $I_n+jQ_n$, is used to provide a mapping factor, $\alpha_n$.

The phase increment per sampling instant is described as follows:

$$\phi = 2\pi\left(\frac{f_\Delta}{f_s}\right) = \pi\frac{F}{RM} = \pi\frac{N(2RM)+K}{RM} = 2\pi N + \frac{K}{RM}\pi. \qquad \text{(EQ-37)}$$

Here $N = \left\lfloor \frac{F}{2RM} \right\rfloor = 0, 1, 2, \ldots$.

For all three implementations, counting up, counting down, and counting up and down, it is shown in (EQ-15) and (EQ-17) (derivations of TYPE C) that $$\theta_n = [\pm n\phi]_{module\ 2\pi} = \tilde{n}\frac{\pi}{RM},$$

where the reference time index $\tilde{n}=0, 1, 2, 3, \ldots, 2RM-1$. The total phase shift from input signal after the arbitrary frequency shift is described as $$\varphi_n = \qquad (EQ\text{-}38)$$

$$\theta_n + \lambda_n = \tilde{n}\frac{\pi}{RM} + \left(\frac{\pi}{4} + \alpha_n \frac{\pi}{2}\right) = \frac{\pi}{2M}\left(\frac{2}{R}\tilde{n} + \frac{M}{2} + M\alpha_n\right)$$

This operation is completed as illustrated in FIG. 4: a multiplier is used to multiply the reference time index $$\tilde{n} \text{ by } \frac{2}{R};$$

another multiplier is used to multiply the mapping factor $\alpha_n$ by M and then a summer is used to add $M\alpha_n$ with m; and then a another summer is used to add the $$\frac{2}{R}\tilde{n}$$

and the sum of the $M\alpha_n$ and m. Without loss of generality, the arbitrary positive integer, M, can be either an even or an odd integer, i.e., M=2 m+p, where p=0 or 1. Since both $\theta_n$ and $\lambda_n$ are limited from zero and $2\pi$, i.e., $$0 \le \varphi_n = \frac{\pi}{2M}\left(\frac{2}{R}\tilde{n} + m + \frac{p}{2} + M\alpha_n\right) < 4\pi \Rightarrow \qquad (EQ\text{-}39)$$

$$0 \le \frac{2}{R}\tilde{n} + m + M\alpha_n + \frac{p}{2} < 8M$$

Therefore, a modulo $2\pi$ operation is required. This is equivalent to a modulo 4M operation. Since all parameters, $$\frac{2}{R}, \tilde{n}, m, \alpha_n, M,$$

are positive integers or zero, the modulo 4M operation is only related to the integer part of (EQ-38), i.e., $$\left(\frac{2}{R}\tilde{n} + m + M\alpha_n + \frac{p}{2}\right)_{module\ 4M} = \left(\frac{2}{R}\tilde{n} + m + M\alpha_n\right)_{module\ 4M} + \frac{p}{2}. \qquad (EQ\text{-}40)$$

Therefore, $$\frac{-p}{2} \le \tilde{\tilde{n}} \equiv \left(\frac{2}{R}\tilde{n} + m + M\alpha_n\right)_{module\ 4M} =$$

$$\text{a non-negative integer} < 4M - \frac{p}{2} \Rightarrow 0 \le \tilde{\tilde{n}} < 4M$$

In other words, if p=1 and the integer part of (EQ-40) is smaller than 4M, adding ½ on top of it does not make it equal or greater than the integer 4M, i.e., the modulo 4M operation is still not required. On the other hand, if p=1 and the integer part of (EQ-40) is equal or greater than 4M, the modulo 4M operation is necessary. Adding ½ on top of it does not prevent this operation not to happen. In short, the new reference time index can be described as follows:

$$\tilde{\tilde{n}} \equiv \begin{cases} \frac{2}{R}\tilde{n} + m + M\alpha_n - 4M, & \text{if } \frac{2}{R}\tilde{n} + m + M\alpha_n \ge 4M \\ \frac{2}{R}\tilde{n} + m + M\alpha_n + 4M, & \text{if } \frac{2}{R}\tilde{n} + m + M\alpha_n < 0 \\ \frac{2}{R}\tilde{n} + m + M\alpha_n, & \text{otherwise} \end{cases} \qquad (EQ\text{-}41)$$

and the equivalent total phase shift, $$0 \le \psi_n = [\varphi_n]_{module\ 2\pi} = \left(\tilde{\tilde{n}} + \frac{p}{2}\right)\frac{\pi}{2M} < 2\pi \Rightarrow 0 \le \tilde{\tilde{n}} < 4M. \qquad (EQ\text{-}42)$$

The sine and cosine function LUTs 430, receiving the reference time index, $\tilde{n}$ and the mapping factor $\alpha_n$ from the phase mapping device 440, is used to output a complex signal, $\tilde{I}_n + j\tilde{Q}_n$, with a frequency shift. Similar to the derivations in (EQ-20), the new reference time index must be in one of the four phase partitions:

(a) $0 \le \psi_n < \pi/2 \Rightarrow 0 \le \left(\tilde{\tilde{n}} + \frac{p}{2}\right)\frac{\pi}{2M} < \pi/2 \Rightarrow 0 \le \tilde{\tilde{n}} + \frac{p}{2} < M \Rightarrow 0 \le \tilde{\tilde{n}} < M$ (EQ-43)

$C_n \equiv \cos\psi_n = \sin\left(\frac{\pi}{2} - \psi_n\right) = \sin\left[\left(M - \tilde{\tilde{n}} - \frac{p}{2}\right)\frac{\pi}{2M}\right] = \sin\left[(M - \tilde{\tilde{n}} - p)\frac{\pi}{2M} + p\frac{\pi}{4M}\right]T_4[M - \tilde{\tilde{n}} - p];$ where $\frac{-p}{2} < M - \tilde{\tilde{n}} - p \le M - \frac{p}{2} \Rightarrow 0 < M - \tilde{\tilde{n}} - p \le M$ $S_n \equiv \sin\psi_n = \sin\left[\tilde{\tilde{n}}\frac{\pi}{2M} + p\frac{\pi}{4M}\right] = T_4[\tilde{\tilde{n}}];$ where $0 \le \tilde{\tilde{n}} < M$ (b) $\pi/2 \le \psi_n < \pi \Rightarrow M \le \tilde{\tilde{n}} + \frac{p}{2} < 2M \Rightarrow M \le \tilde{\tilde{n}} < 2M$ $C_n \equiv \cos\psi_n = -\sin\left(\psi_n - \frac{\pi}{2}\right) = -\sin\left[(\tilde{\tilde{n}} - M)\frac{\pi}{2M} + p\frac{\pi}{4M}\right] - T_4[\tilde{\tilde{n}} - M];$ where $0 \le \tilde{\tilde{n}} - M < M$ $S_n \equiv \sin\psi_n = \sin(\pi - \psi_n) = \sin\left[(2M - \tilde{\tilde{n}} - p)\frac{\pi}{2M} + p\frac{\pi}{4M}\right] = T_4[2M - \tilde{\tilde{n}} - p];$ where $\frac{-p}{2} < 2M - \tilde{\tilde{n}} - p \le M - \frac{p}{2} \Rightarrow 0 < 2M - \tilde{\tilde{n}} - p \le M$ (c) $\pi \le \psi_n < 3\pi/2 \Rightarrow 2M \le \tilde{\tilde{n}} + \frac{p}{2} < 3M \Rightarrow 2M \le \tilde{\tilde{n}} < 3M$ -continued $$C_n \equiv \cos\psi_n = -\sin\left(\frac{3\pi}{2} - \psi_n\right) = -\sin\left[(3M - \tilde{\tilde{n}} - p)\frac{\pi}{2M} + p\frac{\pi}{4M}\right] = -T_4[3M - \tilde{\tilde{n}} - p];$$

where $\frac{-p}{2} < 3M - \tilde{\tilde{n}} - p \leq M - \frac{p}{2} \Rightarrow 0 < 3M - \tilde{\tilde{n}} - p \leq M$ $$S_n \equiv \sin\psi_n = -\sin(\psi_n - \pi) = -\sin\left[(\tilde{\tilde{n}} - 2M)\frac{\pi}{2M} + p\frac{\pi}{4M}\right] = T_4[\tilde{\tilde{n}} - 2M];$$

where $0 \leq \tilde{\tilde{n}} - 2M < M$ (d) $3\pi/2 \leq \psi_n < 2\pi \Rightarrow 3M \leq \tilde{\tilde{n}} + \frac{p}{2} < 4M \Rightarrow 3M \leq \tilde{\tilde{n}} < 4M$ $$C_n \equiv \cos\psi_n = \sin\left(\psi_n - \frac{3\pi}{2}\right) = \sin\left[(\tilde{\tilde{n}} - 3M)\frac{\pi}{2M} + p\frac{\pi}{4M}\right] = T_4[\tilde{\tilde{n}} - 3M];$$

where $0 \leq \tilde{\tilde{n}} - 3M < M$ $$S_n \equiv \sin\psi_n = -\sin(2\pi - \psi_n) = -\sin\left[(4M - \tilde{\tilde{n}} - p)\frac{\pi}{2M} + p\frac{\pi}{4M}\right] = -T_4[4M - \tilde{\tilde{n}} - p];$$

where $\frac{-p}{2} < 4M - \tilde{\tilde{n}} - p \leq M - \frac{p}{2} \Rightarrow 0 < 4M - \tilde{\tilde{n}} - p \leq M$ In short, (a) $0 \leq \tilde{\tilde{n}} < M \Rightarrow S_{cos} = +1, S_{sin} = +1, n_c = M - \tilde{\tilde{n}} - p; n_s = \tilde{\tilde{n}};$ (b) $M \leq \tilde{\tilde{n}} < 2M \Rightarrow S_{cos} = -1, S_{sin} = +1, n_c = \tilde{\tilde{n}} - M; n_s = 2M - \tilde{\tilde{n}} - p;$ (c) $2M \leq \tilde{\tilde{n}} < 3M \Rightarrow S_{cos} = -1, S_{sin} = -1, n_c = 3M - \tilde{\tilde{n}} - p; n_s = \tilde{\tilde{n}} - 2M;$ (d) $3M \leq \tilde{\tilde{n}} < 4M \Rightarrow S_{cos} = +1, S_{sin} = -1, n_c = \tilde{\tilde{n}} - 3M; n_s = 4M - \tilde{\tilde{n}} - p;$ (EQ-44)

The original LUT index, $n_c$ or $n_s$, is equivalent to the original index, n, in (EQ-44) and then calculated separately. The sine and cosine function LUTs 430 is similar to (EQ-22) as follows:

$$T_4[m] = \sin\left[m\frac{\pi}{2M} + p\frac{\pi}{4M}\right], m = 0, 1, 2, 3, \ldots, M.$$ (EQ-45)

This is a LUT with a possible shifted phase, i.e., $$\frac{\pi}{4M},$$

if M is odd (p=1). The required LUT has M+1 entries.

It is noticed from the above equations: the size of the required sine and cosine function LUTs 430 is proportional to the integer value of the denominator. Therefore, although the derivations in TYPE D do include all arbitrary integers for M and K, one should cancel out all common factors among M and K before applying any derivations in TYPE D. Furthermore, if the total denominator, $M_{tot} = R \times M$, is an even integer, one should apply the TYPE D equations with R=2 resulting the sine and cosine function LUTs 430 containing ($M_{tot}/2$)+1 entries. Of course, one can select R=1, $M_{tot}$=2m and p=0 in this case but resulting the sine and cosine function LUTs 430 with a size equals to $M_{tot}$+1. In summary, one should cancel out all common factors among the frequency shift and the sampling frequency, i.e., $2f_\Delta$ and $f_s$ in (EQ-37). Then if the total denominator, $M_{tot} = R \times M$, is an even integer, assign R=2 resulting p=0 or 1. On the other hand, if the total denominator is an odd number, then R=1 and p=1 only.

The implementation of TYPE D which is capable of both positive and negative frequency shift is illustrated in FIG. 4. The corresponding controls are listed in Tables 5 and 6.

Example 6

An Implementation of TYPE D Frequency Shifter 400 of the Present Invention with R=1 and p=1

$$f_s = 7 \text{ MHz},$$ (EQ-46)

$$\phi = 2\pi\left(\frac{f_\Delta}{f_s}\right) = 2\pi\left(\frac{\pm 7N \pm K \times 0.5}{7}\pi\right) = \left(\frac{\pm 14N \pm K}{7}\pi\right),$$

where arbitrary $f_\Delta = (\pm 7N \pm K \times 0.5) = K \times 0.5 = 0, \pm 0.5, \pm 1, \pm 1.5, \pm 2, \pm 2.5, \ldots,$ MHz N is an arbitrary positive integer, K is an arbitrary integer between 0 and 13, and $\hat{K}$ is an arbitrary integer. In short, by controlling integer K from 0 to 13, an arbitrary frequency shift which is an integer multiple of 0.5 MHz can be achieved. Obviously, R=1, M=7, m=3 and p=1 in this example. The reference time index is found as follows:

$$\tilde{n}|_{t=n} = \begin{cases} \tilde{n}|_{t=n-1} + S_1 \times K - 14, & \text{if } \tilde{n}|_{t=n-1} + S_1 \times K \geq 14 \\ \tilde{n}|_{t=n-1} + S_1 \times K + 14, & \text{if } \tilde{n}|_{t=n-1} + S_1 \times K < 0 \\ \tilde{n}|_{t=n-1} + S_1 \times K, & \text{otherwise.} \end{cases}$$ (EQ-47)

where $S_1 = 1$ or $S_1 = -1$ if counting up or down implementation is required, respectively.

The new reference time index is described as follows:

$$\tilde{\tilde{n}} \equiv \begin{cases} 2\tilde{n} + 3 + 7\alpha_n - 28, & \text{if } 2\tilde{n} + 3 + 7\alpha_n \geq 28 \\ 2\tilde{n} + 3 + 7\alpha_n + 28, & \text{if } 2\tilde{n} + 3 + 7\alpha_n < 0 \\ 2\tilde{n} + 3 + 7\alpha_n, & \text{otherwise} \end{cases}$$ (EQ-48)

$$T_4[m] = \sin\left[m\frac{\pi}{14} + \frac{\pi}{28}\right], m = 0, 1, 2, 3, \ldots, 7.$$ (EQ-49)

And the required cos and sin function values to calculate (EQ-3) or (EQ-4) are shown as follows.

(a) $0 \leq \tilde{\tilde{n}} < 7 \Rightarrow S_{cos}=+1, S_{sin}=+1, n_c=7-\tilde{\tilde{n}}-1; n_s=\tilde{\tilde{n}}$ (b) $7 \leq \tilde{\tilde{n}} < 14 \Rightarrow S_{cos}=-1, S_{sin}=+1, n_c=\tilde{\tilde{n}}-7; n_s=14-\tilde{\tilde{n}}-1$ (c) $14 \leq \tilde{\tilde{n}} < 21 \Rightarrow S_{cos}=-1, S_{sin}=-1, n_c=21-\tilde{\tilde{n}}; n_s=\tilde{\tilde{n}}-14$ (d) $21 \leq \tilde{\tilde{n}} < 28 \Rightarrow S_{cos}=+1, S_{sin}=-1, n_c=\tilde{\tilde{n}}-21; n_s=28-\tilde{\tilde{n}}-1;$ (EQ-50)

The size of the required LUT is 7+1=8 entries from (EQ-49). In fact, if p=1, then the highest index, M, of the LUT in (EQ-49) never occurs, i.e., m=0, 1, 2, . . . , M−1. This can be easily shown in (EQ-43) from partitions (a) to (d). To be specific, if M is an even integer, then the required LUT has M+1 entries but only M entries if M is an odd integer.

The sampling rate of the frequency shifter is denoted a positive real number, $f_s$. The desired frequency shift can be an arbitrary (positive or negative) integer multiple of 0.5 MHz if the sampling rate is fixed at 7 MHz. Therefore, with only one set of LUT in (EQ-49), just counting an arbitrary integer ±K in (EQ-47) and (EQ-48) will provide an arbitrary frequency shift at (±7N±K×0.5) MHz, respectively. In other words, this is a very simple and programmable frequency shifter with great flexibility in shifting various frequencies.

Example 7

An Implementation of TYPE D Frequency Shifter 400 of the Present Invention with R=1 and p=0

$$f_s = 12 \text{ MHz}, \quad \text{(EQ-51)}$$
$$\phi = 2\pi\left(\frac{f_\Delta}{f_s}\right) = 2\pi\left(\frac{\pm 12N \pm K \times 0.5}{12}\pi\right) = \left(\frac{\pm 24N \pm K}{2 \times 6}\pi\right),$$

where arbitrary $f_\Delta = (\pm 12N \pm K \times 0.5) = K \times 0.5 = 0, \pm 0.5, \pm 1, \pm 1.5, \pm 2, \pm 2.5, \ldots$ , MHz N is an arbitrary positive integer, K is an arbitrary integer between 0 and 23, and $\hat{K}$ is an arbitrary integer. In short, by controlling integer K from 0 to 23, an arbitrary frequency shift which is an integer multiple of 0.5 MHz can be achieved. Obviously, R=2, M=6, m=3 and p=0 in this example. The reference time index is found as follows:

$$\tilde{n}|_{t=n} = \begin{cases} \tilde{n}|_{t=n-1} + S_1 \times K - 24, & \text{if } \tilde{n}|_{t=n-1} + S_1 \times K \geq 24 \\ \tilde{n}|_{t=n-1} + S_1 \times K + 24, & \text{if } \tilde{n}|_{t=n-1} + S_1 \times K < 0 \\ \tilde{n}|_{t=n-1} + S_1 \times K, & \text{otherwise.} \end{cases} \quad \text{(EQ-52)}$$

where $S_1=1$ or $S_1=-1$ if counting up or down implementation is required, respectively.

The new reference time index is described as follows:

$$\tilde{\tilde{n}} \equiv \begin{cases} \tilde{n} + 3 + 6\alpha_n - 24, & \text{if } \tilde{n} + 3 + 7\alpha_n \geq 24 \\ \tilde{n} + 3 + 6\alpha_n + 24, & \text{if } \tilde{n} + 3 + 7\alpha_n < 0 \\ \tilde{n} + 3 + 6\alpha_n, & \text{otherwise} \end{cases} \quad \text{(EQ-53)}$$

$$T_4[m] = \sin\left[m\frac{\pi}{12}\right], m = 0, 1, 2, 3, \ldots , 6. \quad \text{(EQ-54)}$$

And the required cos and sin values to calculate (EQ-3) or (EQ-4) are shown as follows.

(a) $0 \leq \tilde{\tilde{n}} < 6 \Rightarrow S_{cos}=+1, S_{sin}=+1, n_c=6-\tilde{\tilde{n}}-0; n_s=\tilde{\tilde{n}}$ (b) $6 \leq \tilde{\tilde{n}} < 12 \Rightarrow S_{cos}=-1, S_{sin}=+1, n_c=\tilde{\tilde{n}}-6; n_s=12-\tilde{\tilde{n}}-0$ (c) $12 \leq \tilde{\tilde{n}} < 18 \Rightarrow S_{cos}=-1, S_{sin}=-1, n_c=18-\tilde{\tilde{n}}-0; n_s=\tilde{\tilde{n}}-12$ (d) $18 \leq \tilde{\tilde{n}} < 24 \Rightarrow S_{cos}=+1, S_{sin}=-1, n_c=\tilde{\tilde{n}}-18; n_s=24-\tilde{\tilde{n}}-0$ (EQ-55)

The size of the required LUT is 1+6=7 entries from (EQ-54). The sampling rate of the frequency shifter is denoted a positive real number, $f_s$. The desired frequency shift can be an arbitrary (positive or negative) integer multiple of 0.5 MHz if the sampling rate is fixed at 12 MHz. Therefore, with only one set of LUT in (EQ-54), just counting an arbitrary integer ±K in (EQ-52) and (EQ-53) will provide an arbitrary frequency shift at (±12N±K×0.5) MHz, respectively. In other words, this is a very simple and programmable frequency shifter with great flexibility in shifting various frequencies.

As mentioned above, the size of the LUT is proportional to the denominator, M, including TYPE B, C and D. Therefore, if a small frequency shift, $f_\Delta$, or a large sampling frequency, $f_s$, is required, the size of the required LUT is not small for the perfect accumulated phase tracking. Two implementations to reduce the size of the required LUT are discussed as follows. The required LUT of TYPE C (p=0) or D (p=0, or 1) is described as follows.

$$T[l] = \sin\left[l\frac{\pi}{2M} + p\frac{\pi}{4M}\right], l = 0, 1, 2, 3, \ldots , M. \quad \text{(EQ-56)}$$

where p=0 for TYPE C and p=0 or 1 for TYPE D frequency shifters and the size of the required LUT is M+1. Another LUT with a smaller size $M_1+1$, is designed to implement this TYPE C or D, i.e., $$T_5[l] = \sin\left[l\frac{\pi}{2M_1} + p\frac{\pi}{4M}\right], l = 0, 1, 2, 3, \ldots , M_1 \quad \text{(EQ-57)}$$

where $M > M_1$. The LUT in (EQ-56) or (EQ-57) has stored the sin function values from 0 to π/2 with a resolution of π/(2M) or π/(2 $M_1$), respectively. Since $M > M_1$, the phase offset if $$p = 1 \text{ (i.e., } \frac{\pi}{4M}\text{),}$$

is smaller than one-half of the resolution of the new $$\text{LUT, i.e., } \frac{1}{2} \times \frac{\pi}{2M_1}.$$

Therefore, values found from LUT (EQ-57) are similar to those from the following LUT:

$$T_6[l] = \sin\left[l\frac{\pi}{2M_1} + p\frac{\pi}{4M_1}\right], l = 0, 1, 2, 3, \ldots , M_1 \quad \text{(EQ-58)}$$

Both (EQ-57) or (EQ-58) can be applied with similar results.

Without loss of generality, an index n from 0 to M is found in TYPE C or D before apply the sin LUT, i.e., $0 \leq n \leq M$ and $n = n_c$ or $n_s$. Suppose that M is too large and $M_1$ is already sufficient large for the design spec, then two simplifications to find the required sin function values are described as follows:

(A) The closest index from a smaller LUT.

In the phase domain, the new sin LUT index which is closest to original index n ($n_c$ or $n_s$), is found as follows:

$$0 \leq \hat{n} = n\frac{M_1}{M} \leq M_1 \text{ and } \lfloor \hat{n} \rfloor \leq \hat{n} < \lfloor \hat{n} \rfloor + 1 \quad \text{(EQ-59)}$$

Equation (EQ-59), is just a mapping from M to $M_1$ since both are correspondent to the phase domain from 0 to $\pi/2$. Therefore, the new sin LUT index is either $\lfloor \hat{n} \rfloor$ or $\lfloor \hat{n} \rfloor + 1$, i.e., $$\sin\left(n\frac{\pi}{2M} + p\frac{\pi}{4M}\right) \approx \begin{cases} T_7[\lfloor \hat{n} \rfloor], & \text{if } \hat{n} - \lfloor \hat{n} \rfloor \leq \frac{1}{2} \\ T_7[\lfloor \hat{n} \rfloor + 1], & \text{otherwise} \end{cases} \quad \text{(EQ-60)}$$

where LUT $T_7[]$ is described from either (EQ-57) or (EQ-58).

(B) Linear interpolation from a smaller LUT.

On the other hand, the required sin value can be easily obtained from a simple linear interpolation of the two closest sin LUT values as follows:

$$\sin\left(n\frac{\pi}{2M} + p\frac{\pi}{4M}\right) \approx \quad \text{(EQ-61)}$$
$$(\lfloor \hat{n} \rfloor + 1 - \hat{n}) \times T_7[\lfloor \hat{n} \rfloor] + (\hat{n} - \lfloor \hat{n} \rfloor) \times T_7[\lfloor \hat{n} \rfloor + 1]$$

where LUT $T_7[]$ is described from either (EQ-57) or (EQ-58).

Other implementations are possible from either non-linear or linear interpolation with two or more sin LUT values. However, this linear interpolation with two closest ones is the simplest one.

In both simplifications, the required multiplication or division to calculate the new LUT index can be implemented from the digital shift-and-add operations if the parameters, M and $M_1$, are known in advance. If the denominator, M, is a product of two integers, i.e., $$M = m_2 \times M_1,$$

where $m_2 > 1$ and, without loss of generality, both $m_2$ and $M_1$ are arbitrary positive integers, then equations, (EQ-60) and (EQ-61) can be simplified as follows:

$$(A): \sin\left(n\frac{\pi}{2M} + p\frac{\pi}{4M}\right) \approx \begin{cases} T_7\left[\left\lfloor \frac{n}{m_2} \right\rfloor\right], & \text{if } \frac{n}{m_2} - \left\lfloor \frac{n}{m_2} \right\rfloor \leq \frac{1}{2} \\ T_7\left[\left\lfloor \frac{n}{m_2} \right\rfloor + 1\right], & \text{otherwise} \end{cases} \quad \text{(EQ-62)}$$

$$(B): \sin\left(n\frac{\pi}{2M} + p\frac{\pi}{4M}\right) \approx \quad \text{(EQ-63)}$$
$$\left(\left\lfloor \frac{n}{m_2} \right\rfloor + 1 - \frac{n}{m_2}\right) \times T_7\left[\left\lfloor \frac{n}{m_2} \right\rfloor\right] + \left(\frac{n}{m_2} - \left\lfloor \frac{n}{m_2} \right\rfloor\right) \times T_7\left[\left\lfloor \frac{n}{m_2} \right\rfloor + 1\right]$$

where LUT $T_7[]$ is described from either (EQ-57) or (EQ-58).

In the digital implementations, all registers store the values in the binary format. Another embodiment which takes most advantage of this binary format is described as follows:

If one carefully select a LUT with size $M = 2^L$, where L is a positive integer, the reference time index in (EQ-19) for TYPE C is evaluated as follows:

$$\tilde{n}|_{t=n-1} = \begin{cases} \tilde{n}|_{t=n-1} + S_1 \times K - 2RM, & \text{if } \tilde{n}|_{t=n-1} + S_1 \times \\ & K \geq 2RM = 2^{1+(R-1)+L} \\ \tilde{n}|_{t=n-1} + S_1 \times K + 2RM, & \text{if } \tilde{n}|_{t=n-1} + S_1 \times K < 0 \\ \tilde{n}|_{t=n-1} + S_1 \times K, & \text{otherwise.} \end{cases} \quad \text{(EQ-64)}$$

Therefore, the modulo $2\pi$ operation is equivalent to a modulo $2^{R+L}$ operation, i.e., just taking the (R+L) Less-Significant bits or ignore any Most-Significant bits higher than these bits. No subtraction or addition is required. Furthermore, (EQ-21) can be evaluated as follows:

$$(a) \; 0 \leq \tilde{n} < \frac{RM}{2} = 2^{R+L-2} \Rightarrow S_{cos} = +1, \quad \text{(EQ-65)}$$
$$S_{sin} = +1, n_c = M - \frac{2}{R}\tilde{n}; n_s = \frac{2}{R}\tilde{n}$$

$$(b) \; 2^{R+L-2} \leq \tilde{n} < 2 \times 2^{R+L-2} \Rightarrow S_{cos} = -1,$$
$$S_{sin} = +1, n_c = \frac{2}{R}\tilde{n} - M; n_s = 2M - \frac{2}{R}\tilde{n}$$

$$(c) \; 2 \times 2^{R+L-2} \leq \tilde{n} < 3 \times 2^{R+L-2} \Rightarrow S_{cos} = -1,$$
$$S_{sin} = -1, n_c = 3M - \frac{2}{R}\tilde{n}; n_s = \frac{2}{R}\tilde{n} - 2M$$

$$(d) \; 3 \times 2^{R+L-2} \leq \tilde{n} < 4 \times 2^{R+L-2} \Rightarrow S_{cos} = +1,$$
$$S_{sin} = -1, n_c = \frac{2}{R}\tilde{n} - 3M; n_s = 4M - \frac{2}{R}\tilde{n};$$

The 2 MSB from 00 to 11, which represent 0 to 3 multiples of $2^{R+L-2}$, can be applied to select one of the four partitions. Otherwise, three or four subtractions operations shall be done to determine one of the four partitions.

In short, a special subset of TYPE C or TYPE D is of most interest in which the size of the LUT, either M or $M_1$, can be represented as $2^L$ with a positive integer L.

There is another subset in TYPE C or TYPE D of interest: if the integer $m_2$ is just a power of 2, i.e., $m_2 = 2^L$, then the size of the LUT is reduced from M+1 to $M_1 + 1 = M/2^L + 1$ and the divisions in (EQ-62) and (EQ-63) can be easily implemented by deleting the last L Less-Significant-Bits of the original index, n. In other words, $$(A): \sin\left(n\frac{\pi}{2M} + p\frac{\pi}{4M}\right) \approx \quad \text{(EQ-62a)}$$
$$\begin{cases} T_7[\lfloor n \gg L \rfloor], & \text{if } (n \gg L) - \lfloor n \gg L \rfloor \leq \frac{1}{2} \\ T_7[\lfloor n \gg L \rfloor + 1], & \text{otherwise} \end{cases}$$

$$(B): \sin\left(n\frac{\pi}{2M} + p\frac{\pi}{4M}\right) \approx [\lfloor n \gg L \rfloor + 1 - (n \gg L)] \times \quad \text{(EQ-63a)}$$
$$T_7[\lfloor n \gg L \rfloor] + [(n \gg L) - \lfloor n \gg L \rfloor] \times T_7[\lfloor n \gg L \rfloor + 1]$$

where LUT $T_7[]$ is described from either (EQ-57) or (EQ-58).

In summary: although both simplifications introduce approximation errors, the accumulated phase due to the frequency shift, is still perfectly tracked by the original index, n.

Figure 5:
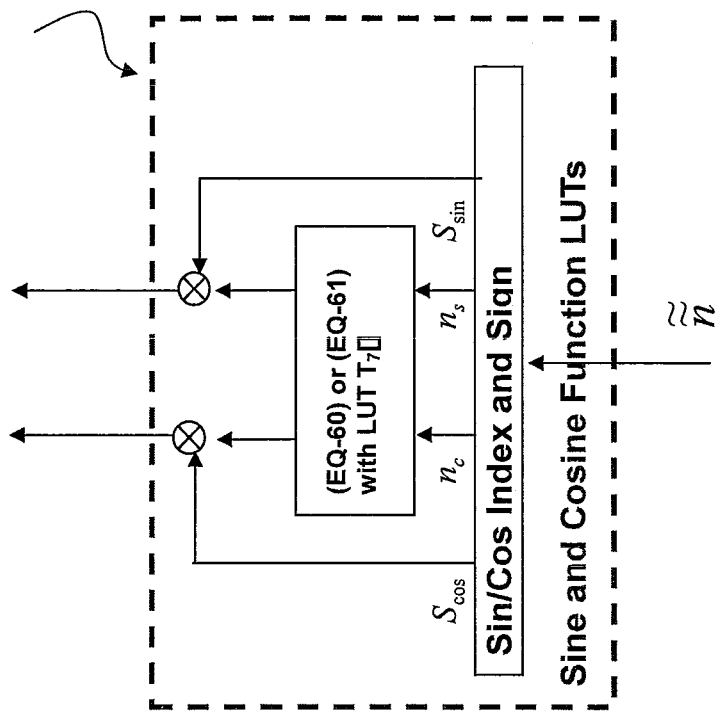
FIG. 5 shows the simplifications of TYPE C and D frequency shifters of the present invention.
Figure 5:
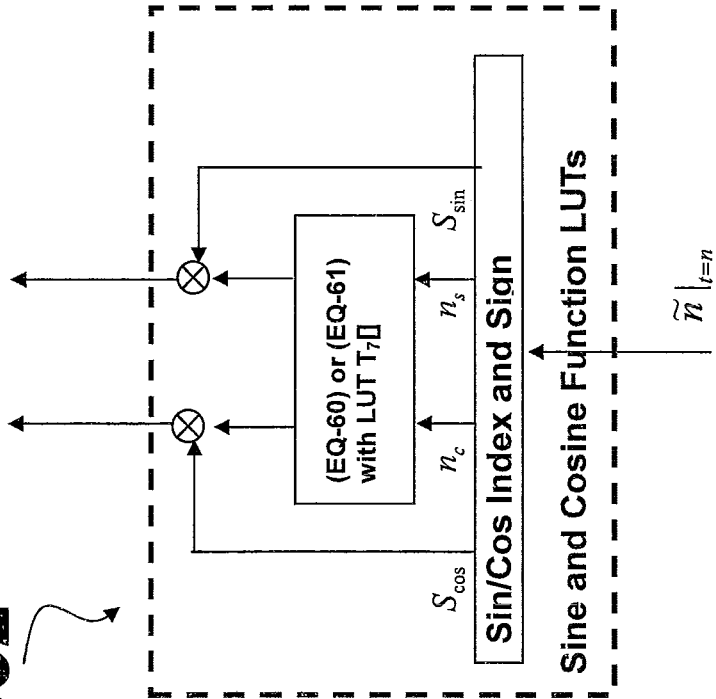

These two simplifications can be easily implemented by replacing the blocks 330 or 430 in FIG. 3 or FIG. 4, with the blocks 332 or 432 in FIG. 5.

Example 8

In this example, same key parameters in Example 5 are applied, i.e., M=70. A smaller LUT with size equals to $M_1+1=65$ is described as follows:

$$T_7[l] = \sin\left[l\frac{\pi}{2\times 64} + p\frac{\pi}{4\times 70}\right] \text{ or } \sin\left[l\frac{\pi}{2\times 64} + p\frac{\pi}{4\times 64}\right]$$

where $l=0, 1, 2, \ldots, 64$. The resolution of the new LUT is $\pi/128$ which is less than 1.5 degrees, i.e., it is considered sufficient for some applications. The required sin LUT values with resolution equals to $\pi/140$, can be obtained from the following two simplifications without significant approximations errors:

(A) The closest index from the smaller LUT.

$$0 \leq \hat{n} = n\frac{64}{70} \leq 64 \text{ and } \lfloor \hat{n} \rfloor \leq \hat{n} < \lfloor \hat{n} \rfloor + 1$$

$$\sin\left(n\frac{\pi}{2\times 70} + p\frac{\pi}{4\times 70}\right) \approx \begin{cases} T_7\left[\left\lfloor \frac{64}{70}n \right\rfloor\right], & \text{if } \frac{64}{70}n - \left\lfloor \frac{64}{70}n \right\rfloor \leq \frac{1}{2} \\ T_7\left[\left\lfloor \frac{64}{70}n \right\rfloor + 1\right], & \text{otherwise} \end{cases} \quad \text{(EQ-66)}$$

(B) Linear interpolation from the smaller LUT.

$$\sin\left(n\frac{\pi}{2\times 70} + p\frac{\pi}{4\times 70}\right) \approx \left(\left\lfloor \frac{64}{70}n \right\rfloor + 1 - \frac{64}{70}n\right) \times T_7\left[\left\lfloor \frac{64}{70}n \right\rfloor\right] + \left(\frac{64}{70}n - \left\lfloor \frac{64}{70}n \right\rfloor\right) \times T_7\left[\left\lfloor \frac{64}{70}n \right\rfloor + 1\right] \quad \text{(EQ-67)}$$

Example 9

In this example, same key parameters in Example 5 are applied, i.e., M=70. A smaller LUT with size equals to $M_1+1=36$ is described as follows:

$$T_7[l] = \sin\left[l\frac{\pi}{2\times 35} + p\frac{\pi}{4\times 70}\right] \text{ or } \sin\left[l\frac{\pi}{2\times 35} + p\frac{\pi}{4\times 35}\right]$$

where $l=0, 1, 2, \ldots, 35$. Two simplifications are derived as follows:

(A) The closest index from the smaller LUT.

$$0 \leq \hat{n} = n\frac{35}{70} \leq 35 \text{ and } \lfloor \hat{n} \rfloor \leq \hat{n} < \lfloor \hat{n} \rfloor + 1$$

$$\sin\left(n\frac{\pi}{2\times 70} + p\frac{\pi}{4\times 70}\right) \approx \begin{cases} T_7\left[\left\lfloor \frac{n}{2} \right\rfloor\right], & \text{if } \frac{n}{2} - \left\lfloor \frac{n}{2} \right\rfloor \leq \frac{1}{2} \\ T_7\left[\left\lfloor \frac{n}{2} \right\rfloor + 1\right], & \text{otherwise} \end{cases} \quad \text{(EQ-68)}$$

(B) Linear interpolation from the smaller LUT.

$$\sin\left(n\frac{\pi}{2\times 70} + p\frac{\pi}{4\times 70}\right) \approx \left\lfloor \frac{n}{2} \right\rfloor + 1 - \frac{n}{2} \times T_7\left[\left\lfloor \frac{n}{2} \right\rfloor\right] + \quad \text{(EQ-69)}$$

$$\left(\frac{n}{2} - \left\lfloor \frac{n}{2} \right\rfloor\right) \times T_7\left[\left\lfloor \frac{n}{2} \right\rfloor + 1\right] \approx \begin{cases} T_7\left[\left\lfloor \frac{n}{2} \right\rfloor\right]; & \text{if } n \text{ is an even integer} \\ \frac{1}{2}\left(T_7\left[\left\lfloor \frac{n}{2} \right\rfloor\right] + T_7\left[\left\lfloor \frac{n}{2} \right\rfloor + 1\right]\right); & \text{if } n \text{ is an odd integer} \end{cases}$$

Example 10

In this example, similar key parameters in Example 9 are applied, i.e., M=140, $M_1=35$ and $m_2=4$. A smaller LUT with size equals to $M_1+1=36$ is described as follows:

$$T_7[l] = \sin\left[l\frac{\pi}{2\times 35} + p\frac{\pi}{4\times 140}\right] \text{ or } \sin\left[l\frac{\pi}{2\times 35} + p\frac{\pi}{4\times 35}\right]$$

where $l=0, 1, 2, \ldots, 35$. Two simplifications are derived as follows:

(A) The closest index from the smaller LUT.

$$0 \leq \tilde{n} = n\frac{35}{140} \leq 35 \text{ and } \lfloor \tilde{n} \rfloor \leq \tilde{n} < \lfloor \tilde{n} \rfloor + 1 \quad \text{(EQ-70)}$$

$$\sin\left(n\frac{\pi}{2\times 140} + p\frac{\pi}{4\times 140}\right) \approx \begin{cases} T_7\left[\left\lfloor \frac{n}{4} \right\rfloor\right], & \text{if } \frac{n}{4} - \left\lfloor \frac{n}{4} \right\rfloor \leq \frac{1}{2} \\ T_7\left[\left\lfloor \frac{n}{4} \right\rfloor + 1\right], & \text{otherwise} \end{cases}$$

(B) Linear interpolation from the smaller LUT.

$$\sin\left(n\frac{\pi}{2\times 140} + p\frac{\pi}{4\times 140}\right) \approx \quad \text{(EQ-71)}$$

$$\left(\left\lfloor \frac{n}{4} \right\rfloor + 1 - \frac{n}{4}\right) \times T_7\left[\left\lfloor \frac{n}{4} \right\rfloor\right] + \left(\frac{n}{4} - \left\lfloor \frac{n}{4} \right\rfloor\right) \times T_7\left[\left\lfloor \frac{n}{4} \right\rfloor + 1\right] \approx$$

$$\begin{cases} T_7\left[\left\lfloor \frac{n}{4} \right\rfloor\right]; & \text{if } n - 4\left\lfloor \frac{n}{4} \right\rfloor = 0 \\ \frac{1}{4}\left(3\times T_7\left[\left\lfloor \frac{n}{2} \right\rfloor\right] + T_7\left[\left\lfloor \frac{n}{2} \right\rfloor + 1\right]\right); & \text{if } n - 4\left\lfloor \frac{n}{4} \right\rfloor = 1 \\ \frac{1}{2}\left(T_7\left[\left\lfloor \frac{n}{2} \right\rfloor\right] + T_7\left[\left\lfloor \frac{n}{2} \right\rfloor + 1\right]\right); & \text{if } n - 4\left\lfloor \frac{n}{4} \right\rfloor = 2 \\ \frac{1}{4}\left(T_7\left[\left\lfloor \frac{n}{2} \right\rfloor\right] + 3\times T_7\left[\left\lfloor \frac{n}{2} \right\rfloor + 1\right]\right); & \text{if } n - 4\left\lfloor \frac{n}{4} \right\rfloor = 3 \end{cases}$$

According to Examples 5, 9, and 10: the size of LUT is reduced from 71 (Example 5) to 36 (Example 9) with the same resolution, i.e., $\frac{\pi}{2\times 70}$ or $M = 70$.

Also the same size LUT can be applied to obtain a smaller resolution, i.e., $\frac{\pi}{2 \times 140}$ or $M = 140$, in Example 10.

By controlling K as shown in the Examples 4 and 5, various frequency shifts can be easily achieved. Although simplifications are implemented, the accumulated phase trajectory is still perfectly tracked by the original index. Therefore, no phase error is accumulated at every sampling instant. The quantization error happens only when applying the LUTs from approximated values of the simplified implementations.

The resolution of required LUT is sufficient for most communication systems if $M_1$ is sufficient large. Then for any high sampling frequency, M, can be obtained from the two simplifications. For example, if a LUT with size $M_1$=128 representing the phase domain from 0 to 90 degrees, the resolution is already smaller than one degree. Any resolution smaller than that (because of a larger M, M>128) can be accurately interpolated from this LUT for most applications.

The derivations in TYPE C and D provide the mathematical models to operate with an arbitrary sampling frequency and an arbitrary frequency shift. With these two simplifications, one can design almost any communication systems with very high sampling frequencies and very small frequency shifts.

Since various types of generalized frequency shifters are presented in this invention, therefore, equations of each type are summarized in the following for reference:

A Generalized Frequency Shifter:

$$\tilde{I}_n + j\tilde{Q}_n = (I_n + jQ_n)e^{j\theta_n} =$$
$$(I_n + jQ_n)e^{\pm j2\pi\left(\frac{f_\Delta}{f_s}\right)n} \equiv (I_n + jQ_n)e^{j(1-2\times PN)n\phi} \equiv (I_n + jQ_n)e^{j(S_1 S_2)n\phi}$$

where PN=0 or 1, $S_1$, $S_2$=1 or $-1$, and $(1-2\times PN)=S_1\times S_2$.

Figure 1:
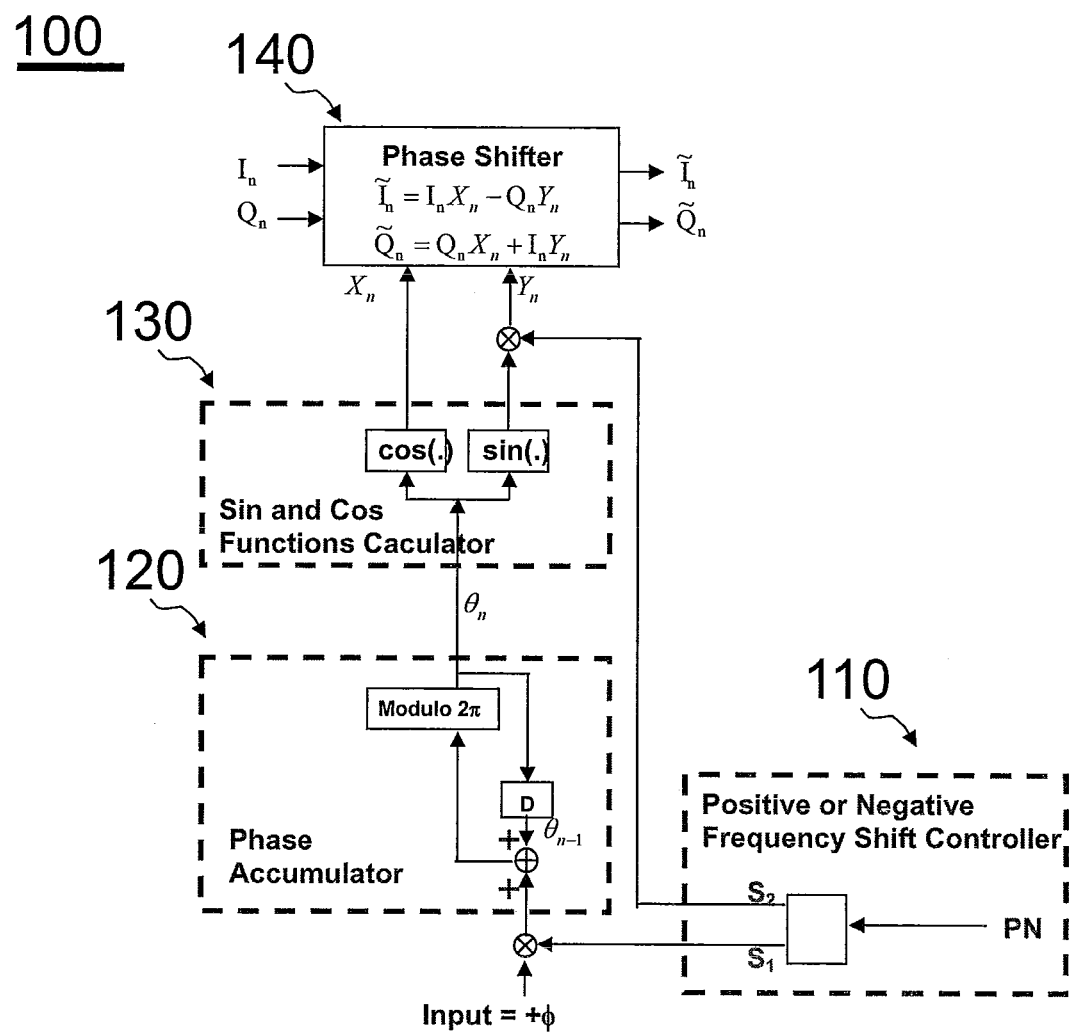
FIG. 1 shows the general implementations of a frequency shifter of the prior art.

(I). Conventional Frequency Shifter (FIG. 1):

$$\tilde{I}_n = I_n \cos(S_1 \times n\phi) - S_2 \times Q_n \sin(S_1 \times n\phi)$$
$$\tilde{Q}_n = Q_n \cos(S_1 \times n\phi) + S_2 \times I_n \sin(S_1 \times n\phi)$$
$$\theta_n = \pm n\left(\frac{2\pi f_\Delta}{f_s}\right) \equiv \pm n\phi = \theta_{n-1} \pm \phi$$

where $\phi \equiv \frac{2\pi f_\Delta}{f_s}$, $\phi$, $f_\Delta$ and $f_s > 0$.

For a positive frequency shift: PN=0, $1-2\times PN=S_1 S_2=1$
For a negative frequency shift: PN=1, $1-2\times PN=S_1 S_2=-1$ (II). TYPE B Frequency Shifter (FIG. 2):

$$\tilde{I}_n = I_n T_1[\tilde{n}] - Q_n \times S_2 T_2[\tilde{n}]$$

$$\tilde{Q}_n = Q_n T_1[\tilde{n}] + I_n \times S_2 T_2[\tilde{n}], 0 \le \tilde{n} \le 2M-1.$$

For a positive frequency shift: PN=0, $1-2\times PN=S_1 S_2=1$, and $S_1, S_2=1, -1$.
For a negative frequency shift: PN=1, $1-2\times PN=S_1 S_2=-1$, and $S_1, S_2=1, -1$.

$$\tilde{n}|_{t=n} = \begin{cases} \tilde{n}|_{t=n-1} + S_1 - 2M, & \text{if } \tilde{n}|_{t=n-1} + S_1 \ge 2M \\ \tilde{n}|_{t=n-1} + S_1 + 2M, & \text{if } \tilde{n}|_{t=n-1} + S_1 < 0 \\ \tilde{n}|_{t=n-1} + S_1, & \text{otherwise.} \end{cases}$$

$$\phi = 2\pi\left(\frac{f_\Delta}{f_s}\right) = \pi\frac{F}{M} = \pi\frac{N(2M)+K}{M} = 2\pi N + \frac{K}{M}\pi, \phi, f_\Delta \text{ and } f_s > 0.$$

where, $$N = \left\lfloor \frac{F}{2M} \right\rfloor,$$

$0 \le K < 2M$, $M \ne 0$, F, M, N, K, and $\tilde{n}$ are non-negative integers.

$$T_1[m] = \cos\left(m\frac{K\pi}{M}\right); T_2[m] = \sin\left(m\frac{K\pi}{M}\right);$$

where m=0, 1, 2, 3, . . . , 2M−1.

(III). TYPE C Frequency Shifter (FIG. 3):

$$\tilde{I}_n = I_n X_n - Q_n \times S_2 Y_n$$

$$\tilde{Q}_n = Q_n X_n + I_n \times S_2 Y_n$$

For a positive frequency shift: PN=0, $1-2\times PN=S_1 S_2=1$, and $S_1, S_2=1, -1$.
For a negative frequency shift: PN=1, $1-2\times PN=S_1 S_2=-1$, and $S_1, S_2=1, -1$.

$$X_n = S_{cos}T_3[n_c], 0 \le n_c \le M.$$

$$Y_n = S_{sin}T_3[n_s], 0 \le n_s \le M.$$

$$T_3[m] = \sin\left[m\frac{\pi}{2M}\right], m = 0, 1, 2, 3, \ldots, M$$

(a) $0 \le \tilde{n} < \frac{RM}{2} \Rightarrow S_{cos} = +1, S_{sin} = +1, n_c = M - \frac{2}{R}\tilde{n};$ $n_s = \frac{2}{R}\tilde{n}$ (b) $\frac{RM}{2} \le \tilde{n} < \frac{2RM}{2} \Rightarrow S_{cos} = -1, S_{sin} = +1, n_c = \frac{2}{R}\tilde{n} - M;$ $n_s = 2M - \frac{2}{R}\tilde{n}$ (c) $\frac{2RM}{2} \le \tilde{n} < \frac{3RM}{2} \Rightarrow S_{cos} = -1, S_{sin} = -1, n_c = 3M - \frac{2}{R}\tilde{n};$ $n_s = \frac{2}{R}\tilde{n} - 2M$ (d) $\frac{3RM}{2} \le \tilde{n} < \frac{4RM}{2} \Rightarrow S_{cos} = +1, S_{sin} = -1, n_c = \frac{2}{R}\tilde{n} - 3M;$ $n_s = 4M - \frac{2}{R}\tilde{n};$ $$\tilde{n}|_{t=n} = \begin{cases} \tilde{n}|_{t=n-1} + S_1 \times K - 2RM, & \text{if } \tilde{n}|_{t=n-1} + S_1 \times K \ge 2RM \\ \tilde{n}|_{t=n-1} + S_1 \times K + 2RM, & \text{if } \tilde{n}|_{t=n-1} + S_1 \times K < 0 \\ \tilde{n}|_{t=n-1} + S_1 \times K, & \text{otherwise.} \end{cases}$$

$0 \le \tilde{n} \le 2RM - 1.$ $$\phi = 2\pi\left(\frac{f_\Delta}{f_s}\right) = \pi\frac{F}{RM} = \pi\frac{N(2RM)+K}{RM} = 2\pi N + \frac{K}{RM}\pi,$$

$\phi$, $f_\Delta$ and $f_s = > 0$.

-continued $$N = \left\lfloor \frac{F}{2RM} \right\rfloor, 0 \le K < 2RM, R = 1 \text{ or } 2$$

where $M>0$, $F$, $M$, $N$, $K$, and $\tilde{n}$, $\tilde{n}_c$, $\tilde{n}_s$, are non-negative integers.

(IV). TYPE D Frequency Shifter (FIG. 4):

$$\tilde{I}_n = S_{cos} T_4[n_c]$$

$$\tilde{Q}_n = S_{sin} T_4[n_s]$$

$$T_4[l] = \sin\left[l\frac{\pi}{2M} + p\frac{\pi}{4M}\right], l = 0, 1, 2, 3, \ldots, M.$$

where $M = 2m + p$, $m = \left\lfloor \frac{M}{2} \right\rfloor$, $p = 0, 1$.

For a positive frequency shift: $PN=0$, $S_1=1$
For a negative frequency shift: $PN=1$, $S_1=-1$ (a) $0 \le \tilde{\tilde{n}} < M \Rightarrow S_{cos} = +1, S_{sin} = +1, n_c = M - \tilde{\tilde{n}} - p$;
$n_s = \tilde{\tilde{n}}$;

(b) $M \le \tilde{\tilde{n}} < 2M \Rightarrow S_{cos} = -1, S_{sin} = +1, n_c = \tilde{\tilde{n}} - M$;
$n_s = 2M - \tilde{\tilde{n}} - p$;

(c) $2M \le \tilde{\tilde{n}} < 3M \Rightarrow S_{cos} = -1, S_{sin} = -1, n_c = 3M - \tilde{\tilde{n}} - p$;
$n_s = \tilde{\tilde{n}} - 2M$;

(d) $3M \le \tilde{\tilde{n}} < 4M \Rightarrow S_{cos} = +1, S_{sin} = -1, n_c = \tilde{\tilde{n}} - 3M$;
$n_s = 4M - \tilde{\tilde{n}} - p$;

$$\tilde{\tilde{n}} \equiv \begin{cases} \frac{2}{R}\tilde{n} + m + M\alpha_n - 4M, & \text{if } \frac{2}{R}\tilde{n} + m + M\alpha_n \ge 4M \\ \frac{2}{R}\tilde{n} + m + M\alpha_n + 4M, & \text{if } \frac{2}{R}\tilde{n} + m + M\alpha_n < 0 \\ \frac{2}{R}\tilde{n} + m + M\alpha_n, & \text{otherwise} \end{cases}$$

$$\tilde{n}|_{t=n} = \begin{cases} \tilde{n}|_{t=n-1} + S_1 \times K - 2RM, & \text{if } \tilde{n}|_{t=n-1} + S_1 \times K \ge 2RM \\ \tilde{n}|_{t=n-1} + S_1 \times K + 2RM, & \text{if } \tilde{n}|_{t=n-1} + S_1 \times K < 0 \\ \tilde{n}|_{t=n-1} + S_1 \times K, & \text{otherwise.} \end{cases}$$

$$\alpha_n = \begin{cases} 0; & \text{if } I_n = +1, Q_n = +1 \\ 1; & \text{if } I_n = -1, Q_n = +1 \\ 2; & \text{if } I_n = -1, Q_n = -1 \\ 3; & \text{if } I_n = +1, Q_n = -1 \end{cases}$$

$$\phi = 2\pi\left(\frac{f_\Delta}{f_s}\right) = \pi\frac{F}{RM} = \pi\frac{N(2RM)+K}{RM} = 2\pi N + \frac{K}{RM}\pi,$$

$$N = \left\lfloor \frac{F}{2RM} \right\rfloor, 0 \le K < 2RM, R = 1 \text{ or } 2$$

where $M>0$, $E$ $M$, $N$, $K$, $m$, $p$ and $\tilde{\tilde{n}}$, $\tilde{n}$, $\tilde{n}_c$, $\tilde{n}_s$, are non-negative integers.

(V). LUT Simplifications ($p=0$ of TYPE C and $p=0,1$ of TYPE D in FIG. 5):

$n=n_s$ or $nd_c$ and $$T_7[l] = \sin\left[l\frac{\pi}{2M_1} + p\frac{\pi}{4M}\right], l = 0, 1, 2, 3, \ldots, M_1$$

or $$T_7[l] = \sin\left[l\frac{\pi}{2M_1} + p\frac{\pi}{4M_1}\right], l = 0, 1, 2, 3, \ldots, M_1$$

(V.1) General case:

$$0 \le \hat{n} = n\frac{M_1}{M} \le M_1$$

and $\lfloor \hat{n} \rfloor \le \hat{n} < \lfloor \hat{n} \rfloor + 1$ (A) $T_3[n]$ or $T_4[n]n\left(n\frac{\pi}{2M} + p\frac{\pi}{4M}\right) \approx \begin{cases} T_7[\lfloor \hat{n} \rfloor], & \text{if } \hat{n} - \lfloor \hat{n} \rfloor \le \frac{1}{2} \\ T_7[\lfloor \hat{n} \rfloor + 1], & \text{otherwise} \end{cases}$ (B) $T_3[n]$ or $T_4[n] = n\left(n\frac{\pi}{2M} + p\frac{\pi}{4M}\right) \approx$ $(\lfloor \hat{n} \rfloor + 1 - \hat{n}) \times T_7[\lfloor \hat{n} \rfloor] + (\hat{n} - \lfloor \hat{n} \rfloor) \times T_7[\lfloor \hat{n} \rfloor + 1]$ (V.2) A special case if $M = m_2 \times M_1$, and $m_2 > 1$ (A) $T_3[n]$ or $T_4[n] = \sin\left(n\frac{\pi}{2M} + p\frac{\pi}{4M}\right) \approx \begin{cases} T_7\left[\left\lfloor \frac{n}{m_2} \right\rfloor\right], & \text{if } \frac{n}{m_2} - \left\lfloor \frac{n}{m_2} \right\rfloor \le \frac{1}{2} \\ T_7\left[\left\lfloor \frac{n}{m_2} \right\rfloor + 1\right], & \text{otherwise} \end{cases}$ (B) $T_3[n]$ or $T_4[n] = \sin\left(n\frac{\pi}{2M} + p\frac{\pi}{4M}\right) \approx$ $\left(\left\lfloor \frac{n}{m_2} \right\rfloor + 1 - \frac{n}{m_2}\right) \times T_7\left[\left\lfloor \frac{n}{m_2} \right\rfloor\right] + \left(\frac{n}{m_2} - \left\lfloor \frac{n}{m_2} \right\rfloor\right) \times T_7\left[\left\lfloor \frac{n}{m_2} \right\rfloor + 1\right]$ (V.3) A special case if $m_2 = 2^L$, and $L>0$.

(A) $T_3[n]$ or $T_4[n] = \sin\left(n\frac{\pi}{2M} + p\frac{\pi}{4M}\right) \approx$ $\begin{cases} T_7[\lfloor n \gg L \rfloor], & \text{if } (n \gg L) - \lfloor n \gg L \rfloor \le \frac{1}{2} \\ T_7[\lfloor n \gg L \rfloor + 1], & \text{otherwise} \end{cases}$ (B) $T_3[n]$ or $T_4[n] = \sin\left(n\frac{\pi}{2M} + p\frac{\pi}{4M}\right) \approx [\lfloor n \gg L \rfloor + 1 - (n \gg L)] \times$ $T_7[\lfloor n \gg L \rfloor] + [(n \gg L) - \lfloor n \gg L \rfloor] \times T_7[\lfloor n \gg L \rfloor + 1]$ Accordingly, the scope of this invention includes, but is not limited to, the actual implementation of the present invention. Although the invention has been explained in relation to its preferred embodiment, it is not used to limit the invention. It is to be understood that many other possible modifications and variations can be made by those skilled in the art without departing from the spirit and scope of the invention as hereinafter claimed.

TABLE 1

The relationship of the resulting frequency shift and the sign indicators.

| PN = Frequency Shift Controller | $S_2$ | $S_1$ | Equation |
|---|---|---|---|
| 0 (Positive Frequency Shift) | +1 | +1 | (EQ-3a) |
| 0 (Positive Frequency Shift) | −1 | −1 | (EQ-3b) |
| 1 (Negative Frequency Shift) | −1 | +1 | (EQ-4a) |
| 1 (Negative Frequency Shift) | +1 | −1 | (EQ-4b) |

TABLE 2

General Implementation

| | PN | $S_2$ | $S_1$ | $\theta_n$ | Equation |
|---|---|---|---|---|---|
| A.1 | 0 | +1 | +1 | $[\theta_{n-1} + \phi]_{modulo\ 2\pi} \equiv [+n\phi]_{modulo\ 2\pi}$ | (EQ-3a) |
| | 1 | −1 | +1 | | (EQ-4a) |
| A.2 | 0 | −1 | −1 | $[\theta_{n-1} - \phi]_{modulo\ 2\pi} \equiv [-n\phi]_{modulo\ 2\pi}$ | (EQ-3b) |
| | 1 | +1 | −1 | | (EQ-4b) |
| A.3 | 0 | +1 | +1 | $[\theta_{n-1} + \phi]_{modulo\ 2\pi} \equiv [+n\phi]_{modulo\ 2\pi}$ | (EQ-3a) |
| | 1 | +1 | −1 | $[\theta_{n-1} - \phi]_{modulo\ 2\pi} \equiv [-n\phi]_{modulo\ 2\pi}$ | (EQ-4b) |
| A.4 | 0 | −1 | −1 | $[\theta_{n-1} - \phi]_{modulo\ 2\pi} \equiv [-n\phi]_{modulo\ 2\pi}$ | (EQ-3b) |
| | 1 | −1 | +1 | $[\theta_{n-1} + \phi]_{modulo\ 2\pi} \equiv [+n\phi]_{modulo\ 2\pi}$ | (EQ-4a) |

A.1: Positive Phase Accumulation Only.
A.2: Negative Phase Accumulation Only.
A.3 and A.4: Positive or Negative Phase Accumulation.

TABLE 3

TYPE B Implementations

| | PN | $S_2$ | $S_1$ | ñ = ReferenceTime Index | Equation |
|---|---|---|---|---|---|
| B.1 | 0 | +1 | +1 | $[n|_{t=n-1} + 1]_{modulo\ 2M} \equiv [+n]_{modulo\ 2M}$ | (EQ-3a) |
| | 1 | −1 | +1 | | (EQ-4a) |
| B.2 | 0 | −1 | −1 | $[n|_{t=n-1} - 1]_{modulo\ 2M} \equiv [-n]_{modulo\ 2M}$ | (EQ-3b) |
| | 1 | +1 | −1 | | (EQ-4b) |
| B.3 | 0 | +1 | +1 | $[n|_{t=n-1} + 1]_{modulo\ 2M} \equiv [+n]_{modulo\ 2M}$ | (EQ-3a) |
| | 1 | +1 | −1 | $[n|_{t=n-1} - 1]_{modulo\ 2M} \equiv [-n]_{modulo\ 2M}$ | (EQ-4b) |
| B.4 | 0 | −1 | −1 | $[n|_{t=n-1} - 1]_{modulo\ 2M} \equiv [-n]_{modulo\ 2M}$ | (EQ-3b) |
| | 1 | −1 | +1 | $[n|_{t=n-1} + 1]_{modulo\ 2M} \equiv [+n]_{modulo\ 2M}$ | (EQ-4a) |

B.1: Counting Up n Only.
B.2: Counting Down n Only.
R.3 and B.4: Counting up or Down n.

TABLE 4

TYPE C Implementations

| | PN | $S_2$ | $S_1$ | ñ = Reference Time Index | Equation |
|---|---|---|---|---|---|
| C.1 | 0 | +1 | +1 | $[n|_{t=n-1} + K]_{modulo\ 2RM} \equiv [+nK]_{modulo\ 2RM}$ | (EQ-3a) |
| | 1 | −1 | +1 | | (EQ-4a) |
| C.2 | 0 | −1 | −1 | $[n|_{t=n-1} - K]_{modulo\ 2RM} \equiv [-nK]_{modulo\ 2RM}$ | (EQ-3b) |
| | 1 | +1 | −1 | | (EQ-4b) |
| C.3 | 0 | +1 | +1 | $[n|_{t=n-1} + K]_{modulo\ 2RM} \equiv [+nK]_{modulo\ 2RM}$ | (EQ-3a) |
| | 1 | +1 | −1 | $[n|_{t=n-1} - K]_{modulo\ 2RM} \equiv [-nK]_{modulo\ 2RM}$ | (EQ-4b) |
| C.4 | 0 | −1 | −1 | $[n|_{t=n-1} - K]_{modulo\ 2RM} \equiv [-nK]_{modulo\ 2RM}$ | (EQ-3b) |
| | 1 | −1 | +1 | $[n|_{t=n-1} + K]_{modulo\ 2RM} \equiv [+nK]_{modulo\ 2RM}$ | (EQ-4a) |

C.1: Counting Up n Only.
C.2: Counting Down n Only.
C.3 and C.4: Counting up or down n.

TABLE 5

TYPE D Implementations

| PN | $S_1$ | ñ = Reference Time Index | Equation |
|---|---|---|---|
| 0 | +1 | $[n|_{t=n-1} + K]_{modulo\ 2RM} \equiv [+nK]_{modulo\ 2RM}$ | (EQ-3a) |
| 1 | −1 | $[n|_{t=n-1} - K]_{modulo\ 2RM} \equiv [-nK]_{modulo\ 2RM}$ | (EQ-4b) |

TABLE 6

Phase Mapping

| $I_n$ | $Q_n$ | $\alpha_n$ |
|---|---|---|
| +1 | +1 | 0 |
| −1 | +1 | 1 |
| −1 | −1 | 2 |
| +1 | −1 | 3 |

Example: For 1 bit ADC Output:
$I_n$ or $Q_n$ = 0 or 1 represents either +1 or −1.

What is claimed is:

1. A frequency shifter for shifting an arbitrary frequency of an input signal in an arbitrary wireless communication system, comprising:

a positive or negative frequency shift controller, used to provide a 1-bit controller PN which controls sign indicators $S_1$ and $S_2$;

a counting up or down counter, receiving a phase increment per sampling instant and the sign indicator $S_1$, used to output an integer reference time index, ñ, which is equivalent to a tracking of an accumulated phase increment $\theta_n$ corresponding to a required phase shift to an arbitrary frequency shift, $\pm f_\Delta$ of the input signal at time instant t=n, wherein $f_\Delta$, is a positive number;

a cosine function Look-Up-Table (LUT) $T_1$ and a sine function LUT, $T_2$, receiving the reference time index, ñ, used to provide sine and cosine values; and a phase shifter, receiving the sine and cosine values from the sine and cosine function LUTs and the sign indicators $S_2$, used to output a complex signal, $\tilde{I}_n + j\tilde{Q}_n$, with a frequency shift of the input signal, $I_n + jQ_n$;

wherein a mathematical relationship between the input and output of the phase shifter is described as follows:

$$\tilde{I}_n = I_n \times T_1[\tilde{n}] - Q_n \times S_2 \times T_2[\tilde{n}]$$

$$\tilde{Q}_n = Q_n \times T_1[\tilde{n}] + I_n \times S_2 \times T_2[\tilde{n}],$$

wherein a sampling rate of the frequency shifter is denoted as a positive number, $f_s$, and a ratio $$\frac{2f_\Delta}{f_s},$$

is a rational number defined in the following mathematical equation:

$$\left(\frac{2f_\Delta}{f_s}\right) = \frac{F}{M} = \frac{N(2M) + K}{M} = 2N + \frac{K}{M}$$

wherein $$N = \left\lfloor \frac{F}{2M} \right\rfloor,$$

$0 \leq K < 2M$, $M \neq 0$, F, M, N and K are non-negative integers; and a notation, $\lfloor x \rfloor$, is the largest integer which is equal to or smaller than a positive value x.

2. The frequency shifter as claimed in claim 1, wherein a relationship between the 1-bit controller PN and sign indicators, $S_2$ and $S_1$, is defined as follows:

$$1 - 2 \times PN = S_2 \times S_1;$$

if the arbitrary frequency shift is a positive number, $+f_\Delta$, then PN=0 and $(S_1, S_2)$=(1, 1) or (-1,-1);
and if the arbitrary frequency shift is a negative number, $-f_\Delta$, then PN=1 and $(S_1, S_2)$=(1, -1) or (-1, 1).

3. The frequency shifter as claimed in claim 1, wherein the reference time index, ñ, is obtained with a modulo 2M operation which is equivalent to a modulo $2K\pi$ operation of the accumulated phase increment, $\theta_n$, which is correspondent to the required phase shift.

4. A frequency shifter for shifting an arbitrary frequency of an input signal in an arbitrary wireless communication system, comprising:
a positive or negative frequency shift controller, used to provide a 1-bit controller PN which controls sign indicators $S_1$ and $S_2$;
a counting up or down counter, receiving a phase increment per sampling instant and the sign indicator $S_1$, used to output an integer reference time index, ñ, which is equivalent to a tracking of an accumulated phase increment $\theta_n$ corresponding to a required phase shift to an arbitrary frequency shift, $\pm f_\Delta$ of the input signal at time instant t=n, wherein $f_\Delta$ is a positive number;
a cosine function Look-Up-Table (LUT) $T_1$ and a sine function LUT $T_2$, receiving the reference time index, ñ, used to provide sine and cosine values; and
a phase shifter, receiving the sine and cosine values from the sine and cosine function LUTs and the sign indicators $S_2$, used to output a complex signal, $\tilde{I}_n + j\tilde{Q}_n$, with a frequency shift of the input signal, $I_n + jQ_n$;

wherein the mathematical relationship between the input and output of the phase shifter is described as follows:

$$\tilde{I}_n = I_n \times T_1[\tilde{n}] - Q_n \times S_2 \times T_2[\tilde{n}]$$

$$\tilde{Q}_n = Q_n \times T_1[\tilde{n}] + I_n \times S_2 \times T_2[\tilde{n}];$$

wherein the reference time index, ñ, is described as follows:

$$\tilde{n}|_{t=n} = \begin{cases} \tilde{n}|_{t=n-1} + S_1 - 2M, & \text{if } \tilde{n}|_{t=n-1} + S_1 \geq 2M \\ \tilde{n}|_{t=n-1} + S_1 + 2M, & \text{if } \tilde{n}|_{t=n-1} + S_1 < 0 \\ \tilde{n}|_{t=n-1} + S_1, & \text{otherwise.} \end{cases}$$

wherein $\tilde{n}|_{t=n}$ the reference time index at t=n and $\tilde{n}|_{t=n-1}$ is the reference time index at t=n-1; $S_1$=1 or -1 is defined as follows:

$$1 - 2 \times PN = S_2 \times S_1;$$

if the arbitrary frequency shift is a positive number, $+f_\Delta$, then PN=0 and $(S_1, S_2)$=(1, 1) or (-1,-1);
and if the arbitrary frequency shift is a negative number, $-f_\Delta$, then PN=1 and $(S_1, S_2)$=(1, -1) or (-1, 1),
K, M are defined as follows:
$M \neq 0$, F, M are non-negative integers, and the reference time index is a non-negative integer from 0 to 2M-1.

5. The frequency shifter as claimed in claim 1, wherein the sine and cosine function LUTs are:

$$T_1[m] = \cos\left(m\frac{K\pi}{M}\right) \text{ and } T_2[m] = \sin\left(m\frac{K\pi}{M}\right), 0 \leq m \leq 2M - 1$$

where the size of the sine and cosine function LUT is 2M each and therefore 4M in total.

6. The frequency shifter as claimed in claim 4, wherein a relationship between the 1-bit controller PN and sign indicators, $S_2$ and $S_1$, is defined as follows:

$$1 - 2 \times PN = S_2 \times S_1;$$

if the arbitrary frequency shift is a positive number, $+f_\Delta$, then PN=0 and $(S_1, S_2)$=(1, 1) or (-1,-1);
and if the arbitrary frequency shift is a negative number, $-f_\Delta$, then PN=1 and $(S_1, S_2)$=(1, -1) or (-1, 1).

7. The frequency shifter as claimed in claim 4, wherein the reference time index, ñ, is obtained with a modulo 2M operation which is equivalent to a modulo $2K\pi$ operation of the accumulated phase increment, $\theta_n$, which is correspondent to the required phase shift.

8. A frequency shifter for shifting an arbitrary frequency of an input signal in an arbitrary wireless communication system, comprising:
a positive or negative frequency shift controller, used to provide a 1-bit controller PN which controls sign indicators $S_1$ and $S_2$;
a counting up or down counter, receiving a phase increment per sampling instant and the sign indicator $S_1$, used to output an integer reference time index, ñ, which is equivalent to a tracking of an accumulated phase increment $\theta_n$ corresponding to a required phase shift to an arbitrary frequency shift, $\pm f_\Delta$ of the input signal at time instant t=n, wherein $f_\Delta$ is a positive number;
a sine and cosine index and sign calculator, receiving the reference time index ñ, used to calculate an index of sine function $n_s$, an index of cosine function $n_c$, a sign of sine function $S_{sin}$, and a sign of cosine function, $S_{cos}$;

a sine function Look-Up-Table (LUT) $T_3$, receiving the indexes $n_s$ and $n_c$, used to output corresponding values $T_3[n_s]$, $T_3[n_c]$ from the LUT; and a phase shifter, receiving the sine and cosine values from the sine and cosine function LUTs and the sign indicators $S_2$, used to output a complex signal, $\tilde{I}_n + j\tilde{Q}_n$, with a frequency shift of the input signal, $I_n + jQ_n$;

wherein a mathematical relationship between the input and output of the phase shifter is described as follows:

$\tilde{I}_n = I_n \times S_{cos} \times T_3[n_c] - Q_n \times S_2 \times S_{sin} \times T_3[n_s]$ $\tilde{Q}_n = Q_n \times S_{cos} \times T_3[n_c] + I_n \times S_2 \times S_{sin} \times T_3[n_s]$;

wherein the relation between a the 1-bit controller PN and sign indicators, $S_2$ and $S_1$, is defined as follows:

$1 - 2 \times PN = S_2 \times S_1$;

if the arbitrary frequency shift is a positive number, $+f_\Delta$, then PN=0 and $S_2 = S_1 = 1$ or $S_2 = S_1 = -1$;
if the arbitrary frequency shift is a negative number, $-f_\Delta$, then PN=1 and $S_2 = -S_1 = 1$ or $S_2 = -S_1 = -1$.

9. The frequency shifter as claimed in claim 8, wherein the reference time index, ñ, is obtained with a modulo $2 \times R \times M$ operation which is equivalent to a modulo $2\pi$ operation of the accumulated phase increment, $\theta_n$, which is correspondent to the required phase shift.

10. The frequency shifter as claimed in claim 8, wherein the sine function LUT is defined as follows:

$$T_3[m] = \sin\left[m\frac{\pi}{2M}\right],$$

m=0, 1, 2, 3, ..., M; and the size of the sine function LUT is M+1.

11. A frequency shifter for shifting an arbitrary frequency of an input signal in an arbitrary wireless communication system, comprising:

a positive or negative frequency shift controller, used to provide a 1-bit controller PN which controls sign indicators $S_1$ and $S_2$;

a counting up or down counter, receiving a phase increment per sampling instant and the sign indicator $S_1$, used to output an integer reference time index, ñ, which is equivalent to a tracking of an accumulated phase increment $\theta_n$ corresponding to a required phase shift to an arbitrary frequency shift, $\pm f_\Delta$ of the input signal at time instant t=n, wherein $f_\Delta$ is a positive number;

a sine and cosine index and sign calculator, receiving the reference time index ñ, used to calculate an index of sine function $n_s$, an index of cosine function $n_c$, a sign of sine function $S_{sin}$, and a sign of cosine function, $S_{cos}$;

a sine function Look-Up-Table (LUT) $T_3$, receiving the indexes $n_s$ and $n_c$, used to output corresponding values $T_3[n_s]$, $T_3[n_c]$ from the LUT; and a phase shifter, receiving the sine and cosine values from the sine and cosine function LUTs and the sign indicators $S_2$, used to output a complex signal, $\tilde{I}_n + j\tilde{Q}_n$, with a frequency shift of the input signal, $I_n + jQ_n$;

wherein a mathematical relationship between the input and output of the phase shifter is described as follows:

$\tilde{I}_n = I_n \times S_{cos} \times T_3[n_c] - Q_n \times S_2 \times S_{sin} \times T_3[n_s]$ $\tilde{Q}_n = Q_n \times S_{cos} \times T_3[n_c] + I_n \times S_2 \times S_{sin} \times T_3[n_s]$;

wherein a sampling rate of the frequency shifter is denoted as a positive real number, $f_s$, and a ratio $$\frac{2f_\Delta}{f_s},$$

is a rational number defined in the following mathematical equation:

$$\left(\frac{2f_\Delta}{f_s}\right) = \frac{F}{R \times M} = \frac{N(2R \times M) + K}{R \times M} = 2N + \frac{K}{R \times M}$$

wherein $$N = \left\lfloor \frac{F}{2RM} \right\rfloor,$$

$0 \leq K < 2RM$, $M \neq 0$, R=1 or 2, F, M N, K, and ñ are non-negative integers; and a notation, $\lfloor x \rfloor$, is the largest integer which is equal to or smaller than a positive value x.

12. The frequency shifter as claimed in claim 11, wherein the reference time index, ñ is described as follows:

$$\tilde{n}|_{t=n} = \begin{cases} \tilde{n}|_{t=n-1} + S_1 \times K - 2RM, & \text{if } \tilde{n}|_{t=n-1} + S_1 \times K \geq 2RM \\ \tilde{n}|_{t=n-1} + S_1 \times K + 2RM, & \text{if } \tilde{n}|_{t=n-1} + S_1 \times K < 0 \\ \tilde{n}|_{t=n-1} + S_1 \times K, & \text{otherwise} \end{cases}$$

wherein $\tilde{n}|_{t=n}$ is the reference time index at t=n and $\tilde{n}|_{t=n-1}$ is the reference time index at t=n-1, $S_1 = 1$ or $S_1 = -1$ is defined as follows:

$1 - 2 \times PN = S_2 \times S_1$;

if the arbitrary frequency shift is a positive number, $+f_\Delta$, then PN=0 and $S_2 = S_1 = 1$ or $S_2 = S_1 = -1$;
if the arbitrary frequency shift is a negative number, $-f_\Delta$, then PN=1 and $S_2 = -S_1 = 1$ or $S_2 = -S_1 = -1$,
K, R, M are defined in claim 11, and the reference time index is a non-negative integer from 0 to 2RM-1.

13. The frequency shifter as claimed in claim 12, wherein a mathematical relationship between the input and outputs of the sine and cosine index and sign calculator is described as follows:

(a) $0 \leq \tilde{n} < \frac{RM}{2} \Rightarrow S_{cos} = +1, S_{sin} = +1, n_c = M - \frac{2}{R}\tilde{n}$;

$n_s = \frac{2}{R}\tilde{n}$ (b) $\frac{RM}{2} \leq \tilde{n} < \frac{2RM}{2} \Rightarrow S_{cos} = -1, S_{sin} = +1, n_c = \frac{2}{R}\tilde{n} - M$;

$n_s = 2M - \frac{2}{R}\tilde{n}$ (c) $\frac{2RM}{2} \leq \tilde{n} < \frac{3RM}{2} \Rightarrow S_{cos} = -1, S_{sin} = -1, n_c = 3M - \frac{2}{R}\tilde{n}$;

$n_s = \frac{2}{R}\tilde{n} - 2M$ (d) $\frac{3RM}{2} \leq \tilde{n} < \frac{4RM}{2} \Rightarrow S_{cos} = +1, S_{sin} = -1, n_c = \frac{2}{R}\tilde{n} - 3M$;

$n_s = 4M - \frac{2}{R}\tilde{n}$;

wherein, the reference time index, ñ, is defined in claim 12 as a non-negative integer between 0 and 2×R×M−1, R=1 or 2, M is an integer defined in claim 11, and $n_c$, $n_s$ are non-negative integers from 0 to M.

14. The frequency shifter as claimed in claim 11, wherein two values from sine LUT, $T_3[n_c]$ and $T_3[n_s]$, can be approximated from a smaller size LUT, $T_7$, with two new integer indexes which are derived from sizes of LUTs $T_3$ and $T_7$, representing the closest indexes of a new LUT, $T_7$, which have the closest LUT value to the original ones, wherein the mathematical relationship between $T_3$ and $T_7$ is defined as follows:

$$T_3[n] \approx T_7[\hat{n}],$$

where the index h is described as follows:

$$\hat{n} = \begin{cases} \lfloor n\frac{M_1}{M} \rfloor; & \text{if } \left(n\frac{M_1}{M}\right) - \lfloor n\frac{M_1}{M} \rfloor \leq 0.5 \\ \lfloor n\frac{M_1}{M} \rfloor + 1; & \text{otherwise;} \end{cases}$$

and
the LUT $T_7$ is defined as follows:

$$T_7[m] = \sin\left[m\frac{\pi}{2M_1}\right], m = 0, 1, 2, 3, \ldots, M_1,$$

wherein integer $0 < M_1 \leq M$, M is defined in claim 11, and the size of the sine function LUT is $M_1+1$.

15. The frequency shifter as claimed in claim 14, wherein the two values from sine LUT, $T_3[n_c]$ and $T_3[n_s]$, can be approximated from a linear interpolation of two nearest LUT values from $T_7$, in claim 14, as follows:

$$T_3[n] \approx$$
$$\left(\lfloor n\frac{M_1}{M} \rfloor + 1 - n\frac{M_1}{M}\right) \times T_7\left[\lfloor n\frac{M_1}{M} \rfloor\right] + \left(n\frac{M_1}{M} - \lfloor n\frac{M_1}{M} \rfloor\right) \times T_7\left[\lfloor n\frac{M_1}{M} \rfloor + 1\right]$$

wherein index $n=n_c$ or $n_s$, integer $M_1$ is the size of the new LUT defined in claim 14, and integer M is defined in claim 11.

16. The frequency shifter as claimed in claim 11, wherein the reference time index, ñ, is obtained with a modulo 2×R×M operation which is equivalent to a modulo $2\pi$ operation of the accumulated phase increment, $\theta_n$, which is correspondent to the required phase shift.

17. The frequency shifter as claimed in claim 11, wherein the sine function LUT is defined as follows:

$$T_3[m] = \sin\left[m\frac{\pi}{2M}\right], m = 0, 1, 2, 3, \ldots, M;$$

and size of the sine function LUT is M+1.

18. A frequency shifter for shifting an arbitrary frequency of an input signal in an arbitrary wireless communication system, comprising:
- a positive or negative frequency shift controller, used to provide a 1-bit controller PN which controls a sign indicators $S_1$;
- a counting up or down counter, receiving a phase increment per sampling instant and the sign indicator $S_1$, used to output an integer reference time index, ñ, which is equivalent to a tracking of an accumulated phase increment $\theta_n$ corresponding to a required phase shift to an arbitrary frequency shift, $\pm f_\Delta$ of the input signal at time instant t=n, wherein $f_\Delta$, is a positive number;
- a phase mapping block, receiving a input complex signal, $I_n+jQ_n$, used to output a parameter, $\alpha_n$, indicating a phase of input complex signal;
- a sine and cosine index and sign calculator, receiving a modified reference time index, $\tilde{n}$, used to calculate an index of sine function $n_s$, an index of cosine function $n_c$, a sign of sine function $S_{sin}$, and a sign of cosine function, $S_{cos}$;
- a sine function Look-Up-Table (LUT) $T_4$, receiving the indexes $n_s$ and $n_c$ and the signs, $S_{cos}$ and $S_{sin}$, used to output corresponding values $T_4[n_s]$, $T_4[n_c]$ from the LUT, and calculate a complex signal, $\tilde{I}_n+j\tilde{Q}_n$, with a frequency shift of the input signal, $I_n+jQ_n$;
- wherein the modified reference time index, $\tilde{n}$, is calculated from the reference time index, ñ, design parameters, R=1, M≠0, and $\alpha_n$; and an output of the phase shifter is described as follows:

$$\tilde{I}_n = S_{cos}T_4[n_c]$$

$$\tilde{Q}_n = S_{sin}T_4[n_s].$$

19. The frequency shifter as claimed in claim 18, wherein the complex input signal, $I_n+jQ_n$, is a pair of 1-bit digital signal at time instant t=n, $I_n$ or $Q_n$, is 0 or 1;

where 0 or 1 represents a fixed arbitrary number either positive or negative, +A or −A, where A is a fixed, arbitrary positive number.

20. The frequency shifter as claimed in claim 18, wherein the phase mapping block receives the complex signal, $I_n+jQ_n$, and outputs a parameter, $\alpha_n$, according to the following equation:

$$\alpha_n = \begin{cases} 0; & \text{if } I_n = +A, Q_n = +A \\ 1; & \text{if } I_n = -A, Q_n = +A \\ 2; & \text{if } I_n = -A, Q_n = -A \\ 3; & \text{if } I_n = +A, Q_n = -A \end{cases}$$

where A is an arbitrary positive number.

21. The frequency shifter as claimed in claim 18, wherein the relation between the 1-bit controller PN and the sign indicator, $S_1$, is defined as follows:

$$1-2\times PN = S_1;$$

if the arbitrary frequency shift is a positive number, $+f_\Delta$, then PN=0 and $S_1=1$; and
if the arbitrary frequency shift is a negative number, $-f_\Delta$, then PN=1 and $S_1=-1$.

22. The frequency shifter as claimed in claim 18, wherein a sampling rate of the frequency shifter is a positive real number denoted as $f_s$, and a ratio $$\frac{2f_\Delta}{f_s},$$

is a rational number defined in the following mathematical equation:

$$\left(\frac{2f_\Delta}{f_s}\right) = \frac{F}{R \times M} = \frac{N(2R \times M) + K}{R \times M} = 2N + \frac{K}{R \times M}$$

wherein $$N = \left\lfloor \frac{F}{2RM} \right\rfloor,$$

$0 \leq K < 2RM$, $M \neq 0$, $R=1$ or $2$, $F$, $M$, $N$, $K$, and $ñ$ are non-negative integers; and a notation, $\lfloor x \rfloor$, represents the largest integer which is equal to or smaller than a positive value x.

23. The frequency shifter as claimed in claim 22, wherein the sine function LUT is defined as follows:

$$T_4[l] = \sin\left[l\frac{\pi}{2M} + p\frac{\pi}{4M}\right] l = 0, 1, 2, 3, \ldots, M$$

where integer M is defined in claim 22 and integer p=0, 1, $$m = \left\lfloor \frac{M}{2} \right\rfloor$$

is an arbitrary non-negative inter, and size of the sine function LUT is M+1.

24. The frequency shifter as claimed in claim 22, wherein the two values from sine and cosine LUT, $T_4[n_c]$ and $T_4[n_s]$, can be approximated from a smaller size LUT, $T_8$, with two new integer indexes which are derived from sizes of LUTs $T_4$ and $T_8$, representing closest indexes of the new LUT which have the closest LUT value to the original ones, wherein the mathematical relationship between $T_4$ and $T_8$ is defined as follows:

$$T_4[n] \approx T_8[\hat{n}],$$

where $\hat{n}$ is $$\hat{n} = \begin{cases} \left\lfloor n\frac{M_1}{M} \right\rfloor; & \text{if } \left(n\frac{M_1}{M}\right) - \left\lfloor n\frac{M_1}{M} \right\rfloor \leq 0.5 \\ \left\lfloor n\frac{M_1}{M} \right\rfloor + 1; & \text{otherwise;} \end{cases}$$

and
the new LUT $T_8$ is defined as follows:

$$T_8[m] = \sin\left[m\frac{\pi}{2M_1} + p\frac{\pi}{4M}\right], m = 0, 1, 2, 3, \ldots, M_1$$

wherein integer $0 < M_1 \leq M$, integer M is defined in claim 22, integer p=0 or 1, and size of the sine function LUT is $M_1+1$.

25. The frequency shifter as claimed in claim 24, wherein the two values from sine and cosine LUT, $T_4[n_c]$ and $T_4[n_s]$, can be approximated from a linear interpolation of two values from the LUT, $T_8$, in claim 26 as follows:

$$T_4[n] \approx$$

$$\left(\left\lfloor n\frac{M_1}{M} \right\rfloor + 1 - n\frac{M_1}{M}\right) \times T_8\left[\left\lfloor n\frac{M_1}{M} \right\rfloor\right] + \left(n\frac{M_1}{M} - \left\lfloor n\frac{M_1}{M} \right\rfloor\right) \times T_8\left[\left\lfloor n\frac{M_1}{M} \right\rfloor + 1\right]$$

wherein index $n=n_c$ or $n_s$, integer $M_1$ is defined in claim 26, and integer M is defined in claim 22.

26. The frequency shifter as claimed in claim 24, wherein the LUT $T_8$ can be replaced with another LUT as follows:

$$T_8[m] = \sin\left[m\frac{\pi}{2M_1} + p\frac{\pi}{4M_1}\right], m = 0, 1, 2, 3, \ldots, M_1$$

where integers p, $M_1$, and M have the same definitions in claim 24.

27. The frequency shifter as claimed in claim 18, wherein the reference time index, $ñ$, is obtained with a modulo $2 \times R \times M$ operation which is equivalent to a modulo $2\pi$ operation of the accumulated phase increment, $\theta_n$, which is correspondent to the required phase shift.

28. The frequency shifter as claimed in claim 22, wherein the reference time index, $ñ$ is described as follows:

$$ñ|_{t=n} = \begin{cases} ñ|_{t=n-1} + S_1 \times K - 2RM, & \text{if } ñ|_{t=n-1} + S_1 \times K \geq 2RM \\ ñ|_{t=n-1} + S_1 \times K + 2RM, & \text{if } ñ|_{t=n-1} + S_1 \times K < 0 \\ ñ|_{t=n-1} + S_1 \times K, & \text{otherwise} \end{cases}$$

wherein $ñ|_{t=n}$ is a reference time index at t=n and $ñ|_{t=n-1}$ is a reference time index at t=n-1, $S_1=1$ or $S_1=-1$ is defined as follows:

$$1 - 2 \times PN = S_1;$$

if the arbitrary frequency shift is a positive number, $+f_\Delta$, then PN=0 and $S_1=1$; and if the arbitrary frequency shift is a negative number, $-f_\Delta$, then PN=1 and $S_1=-1$, K, R, M are defined in claim 22, and the reference time index is a non-negative integer from 0 to 2RM−1.

29. The frequency shifter as claimed in claim 28, wherein the modified reference time index, $\tilde{n}$, is calculated as follows:

$$\tilde{n} \equiv \begin{cases} \frac{2}{R}ñ + m + M\alpha_n - 4M, & \text{if } \frac{2}{R}ñ + m + M\alpha_n \geq 4M \\ \frac{2}{R}ñ + m + M\alpha_n + 4M, & \text{if } \frac{2}{R}ñ + m + M\alpha_n < 0 \\ \frac{2}{R}ñ + m + M\alpha_n, & \text{otherwise.} \end{cases}$$

where integer M=2m+p defined in claim 22, p=0, 1, $$m = \left\lfloor \frac{M}{2} \right\rfloor$$

is an arbitrary non-negative integer, $\alpha_n$ is defined according to the following equation:

$$\alpha_n = \begin{cases} 0; & \text{if } I_n = +A, Q_n = +A \\ 1; & \text{if } I_n = -A, Q_n = +A \\ 2; & \text{if } I_n = -A, Q_n = -A \\ 3; & \text{if } I_n = +A, Q_n = -A \end{cases}$$

where A is an arbitrary positive number,

R is defined in claim 22, the reference time index ñ is defined in claim 28, and the modified reference time index is a non-negative integer from 0 to 4M−1.

30. The frequency shifter as claimed in claim 29, wherein a mathematical relationship between the input and outputs of the sine and cosine index and sign calculator is described as follows:

(a) $0 \leq \tilde{\tilde{n}} < M \Rightarrow S_{cos}=+1, S_{sin}=+1, n_c=M-\tilde{\tilde{n}}-p; n_s=\tilde{\tilde{n}};$ (b) $M \leq \tilde{\tilde{n}} < 2M \Rightarrow S_{cos}=-1, S_{sin}=+1, n_c=\tilde{\tilde{n}}-M; n_s=2M-\tilde{\tilde{n}}-p;$ (c) $2M \leq \tilde{\tilde{n}} < 3M \Rightarrow S_{cos}=-1, S_{sin}=-1, n_c=3M-\tilde{\tilde{n}}-p; n_s=\tilde{\tilde{n}}-2M;$ (d) $3M \leq \tilde{\tilde{n}} < 4M \Rightarrow S_{cos}=+1, S_{sin}=-1, n_c=\tilde{\tilde{n}}-3M; n_s=4M-\tilde{\tilde{n}}-p;$ wherein the modified reference time index, $\tilde{\tilde{n}}$, defined in claim 29 is a non-negative integer between 0 and 4M−1, R=1 or 2, integer M is defined in claim 22, integer p=0, 1, $$m = \left\lfloor \frac{M}{2} \right\rfloor$$

is an arbitrary non-negative inter, and $n_c$, $n_s$ are non-negative integers from 0 to M.

* * * * *